(12) United States Patent
Kitagawa et al.

(10) Patent No.: US 10,496,339 B2
(45) Date of Patent: Dec. 3, 2019

(54) PRINTER THAT DETECTS A FACE AS A SUBJECT, CAMERA WITH PRINTER, AND PRINTING METHOD

(71) Applicant: FUJIFILM Corporation, Tokyo (JP)

(72) Inventors: Yusuke Kitagawa, Tokyo (JP); Shinichi Fujimoto, Tokyo (JP); Tsuneo Sato, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 61 days.

(21) Appl. No.: 15/833,316

(22) Filed: Dec. 6, 2017

(65) Prior Publication Data
US 2018/0173471 A1 Jun. 21, 2018

(30) Foreign Application Priority Data

Dec. 15, 2016 (JP) .................. 2016-243286
Nov. 15, 2017 (JP) .................. 2017-219967

(51) Int. Cl.
| G06F 3/12 | (2006.01) |
| G06K 15/00 | (2006.01) |
| G06K 15/02 | (2006.01) |
| B41J 3/44 | (2006.01) |
| G06K 9/00 | (2006.01) |
| H04N 1/00 | (2006.01) |

(52) U.S. Cl.
CPC ............ *G06F 3/1208* (2013.01); *B41J 3/445* (2013.01); *G06F 3/125* (2013.01); *G06K 9/00228* (2013.01); *G06K 15/005* (2013.01); *G06K 15/1852* (2013.01); *G06K 15/1868* (2013.01); *G06K 15/1889* (2013.01); *H04N 1/00278* (2013.01)

(58) Field of Classification Search
CPC ... G06F 3/1208; G06F 3/125; H04N 1/00278; G06K 9/00228; G06K 15/005; G06K 15/1852; G06K 15/1889; G06K 15/1868; B41J 3/445
See application file for complete search history.

(56) References Cited

U.S. PATENT DOCUMENTS

2003/0197882 A1* 10/2003 Tsukuba ............... G06K 15/021
  358/1.12
2003/0197894 A1* 10/2003 Miyamoto ............. G06K 15/00
  358/1.18

FOREIGN PATENT DOCUMENTS

| JP | H11-275493 A | 10/1999 |
| JP | 2002-006409 A | 1/2002 |
| JP | 2002006409 A * | 1/2002 |

OTHER PUBLICATIONS

Extended European Search Report issued by the European Patent Office dated Apr. 18, 2018, which corresponds to EP17203153.6-1202 and is related to U.S. Appl. No. 15/833,316.

* cited by examiner

*Primary Examiner* — Christopher Wait
(74) *Attorney, Agent, or Firm* — Studebaker & Brackett PC

(57) ABSTRACT

In a printer according to an aspect, since a received image is rotated such that the marginal area is positioned in a specific direction with respect to the subject in a case where the image is printed on the instant film, it is possible to acquire the print on which the marginal area is positioned in the desired direction with respect to the subject in a case where the image is printed by using the instant film having the image forming area and the marginal area. A user can fill out a message in such a marginal area, and can acquire a print having a good appearance.

20 Claims, 25 Drawing Sheets

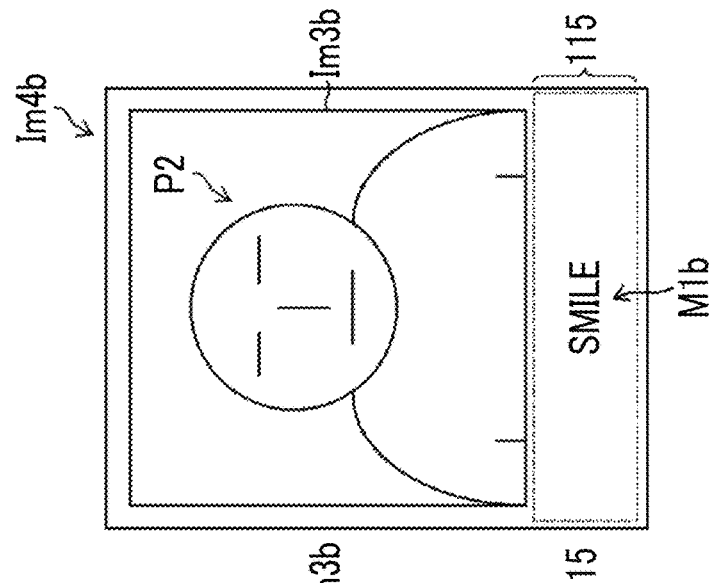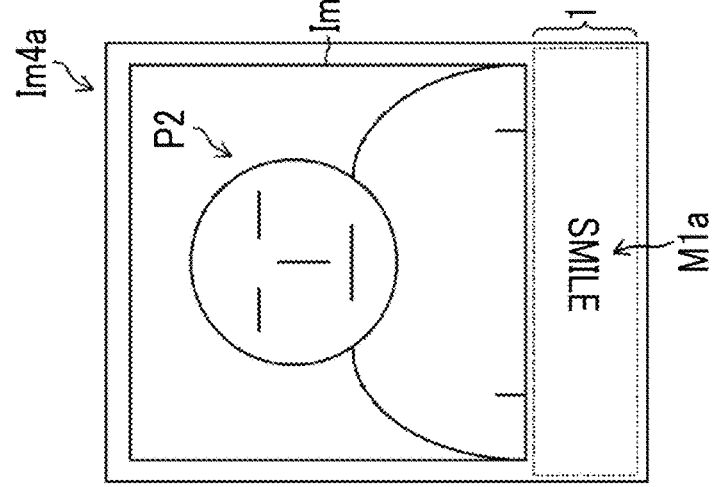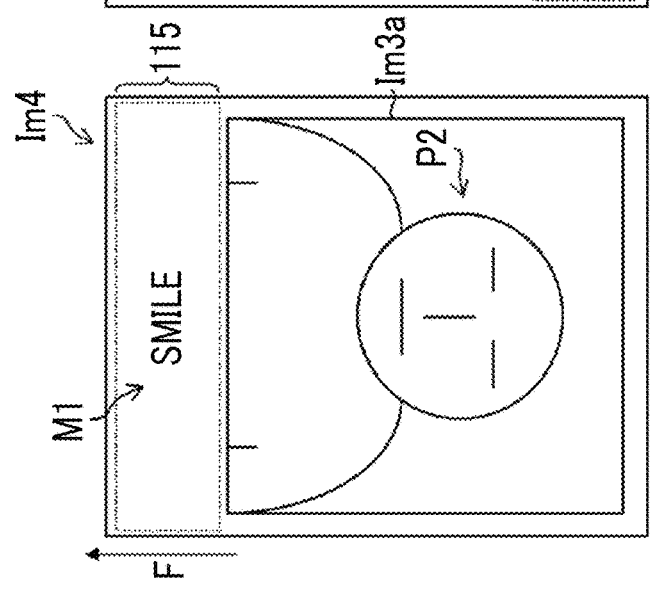

PRINTER THAT DETECTS A FACE AS A SUBJECT, CAMERA WITH PRINTER, AND PRINTING METHOD

CROSS-REFERENCE TO RELATED APPLICATIONS

The present application claims priority under 35 U.S.C. § 119 to Japanese Patent Application Nos. 2016-243286, filed on Dec. 15, 2016 and 2017-219967, filed on Nov. 15, 2017. Each of the above application(s) is hereby expressly incorporated by reference, in its entirety, into the present application.

BACKGROUND OF THE INVENTION

1. Field of the Invention

The present invention relates to a printer, a camera with a printer, and a printing method, and particularly, to a printer, a camera with a printer, and a printing method which print an image on an instant film.

2. Description of the Related Art

A printer that uses an instant film or a camera using such a printer has been known. In a case where an image is printed by these devices, a user fills out a message in a marginal area (an area different from an area in which an image is formed) of the film, and gives the film to a friend or an acquaintance. The message is handwritten by the user or is printed by the printer. For example, in JP2002-6409A, a message is printed in a marginal area by a thermal head or an inkjet head provided separately from an exposure head for image printing.

SUMMARY OF THE INVENTION

In a case where a message is filled out or printed in a marginal area in an instant film, the marginal areas may be different in various directions (upward, downward, leftward, rightward, and inclined directions) with a subject in some conditions (for example, the subject faces the inclined direction or the camera is inclined) such as an orientation of the subject or an orientation of the camera. Since the marginal area is not positioned in a desired direction with respect to the subject, a balance between the marginal area (and the filled message) and the subject is lost, and thus, it is hard to see the marginal area and the subject. Accordingly, there is a possibility that a print desired by the user will not be acquired. However, JP2002-6409A does not take account of such problems.

As stated above, in the technology of the related art, a print on which the marginal area is positioned in a desired direction with respect to the subject is not acquired in a case where an image is printed by using an instant film.

The present invention has been made in view of such circumstances, and it is an object to provide a printer, a camera with a printer, and a printing method which acquire a print on which a marginal area is positioned in a desired direction with respect to a subject in a case where an image is printed by using an instant film having an image forming area and a marginal area.

In order to achieve the above-described object, a printer according to a first aspect of the present invention is a printer that prints an image on an instant film having an image forming area and a marginal area which is formed in one side and wider than other marginal areas in other sides and is an area different from the image forming area. The printer comprises: an image input unit that receives an image; a subject detection unit that detects a subject from the received image; an image rotation unit that rotates the received image according to an orientation of the subject such that the marginal area is positioned in a specific direction with respect to the subject in a case where the rotated image is printed on the instant film; and a print unit that prints the rotated image on the instant film.

In the printer according to the first embodiment, since the image received such that the marginal area is positioned in the specific direction with respect to the subject is rotated in a case where the image is printed on the instant film, it is possible to acquire the print on which the marginal area is positioned in the desired direction with respect to the subject in a case where the image is printed by using the instant film having the image forming area and the marginal area. The user fills out the message in such a marginal area, and thus, it is possible to acquire the print having a good appearance. In the first aspect, a front area or a rear area in an area which is different from the image forming area in the transport direction in a case where the image is printed may be used as the "marginal area".

In a case where the image is rotated, the orientation of the subject may be determined by performing image processing, or may be determined by the orientation of the capturing device (digital camera) that acquires the image. For example, in a case where the orientation of the subject is determined by the orientation of the capturing device, it is possible to set a direction opposite to a gravity direction detected by an acceleration sensor as an upward direction.

In the first aspect, the printer according to a second aspect further comprises: a display control unit that arranges the rotated image and the marginal area such that the marginal area is positioned in the specific direction with respect to the rotated image, and displays the rotated image and the marginal area on a display device. According to the second aspect, it is possible to previously check the relationship between the marginal area and the image, and it is possible to easily acquire an intended print. In a case where the printer includes the monitor (display device), it is possible to display the rotated image and the marginal area on the monitor. In a case where the printer is operated by a terminal device such as a personal computer or a smartphone, the rotated image and the marginal area may be displayed on the monitor of the terminal device.

In the second aspect, in the printer according to a third aspect, the display control unit displays a sample of a message on the display device in a direction corresponding to the arrangement (the arrangement in which the marginal area is positioned in the specific direction with respect to the rotated image, as described in the second embodiment) in the displayed marginal area. According to the third aspect, it is possible to check the state in which the user fills out the message in the marginal area in the above-described arrangement by the display device, and it is possible to easily acquire an intended print. Similarly to the second aspect, the sample of the message may be displayed on the monitor of the printer, or may be displayed by another terminal device such as the smartphone. The sample of the message may include letters, numbers, and symbols.

In the second or third aspect, in the printer according to a fourth aspect, the display control unit displays an image for display, which is acquired by rotating the received image or the rotated image according to a transport direction of the instant film in a case where the image is printed, on the display device. The display image is displayed as in the fourth aspect. Thus, it is possible to match the image for display to be displayed on the display device with the transport direction of the instant film in a case where the image is printed, and it is possible to easily check the printing state. It is possible to reduce user's feeling of incompatibility due to the fact that the image for display and the orientation of the image to be printed are different.

In any one of the first to fourth aspects, in the printer according to a fifth aspect, the specific direction is an upward direction or a downward direction with respect to the detected subject. It is assumed that the fifth aspect is a specific example of the relationship between the marginal area and the subject.

In any one of the first to fifth aspects, in the printer according to a sixth aspect, the subject detection unit detects a face of a person as the subject. According to the sixth aspect, it is possible to acquire the print on which the marginal area is positioned in the desired direction with respect to the face of the person.

In the sixth aspect, in the printer according to a seventh aspect, the image rotation unit rotates the received image such that the marginal area is positioned on an upper side of the face of the person. Since the seventh aspect is an aspect of the relationship between the marginal area and the face, the "upper side" may be, for example, a head top direction.

In the sixth aspect, in the printer according to an eighth aspect, the image rotation unit rotates the received image such that the marginal area is positioned on a lower side of the face of the person. Since it is assumed that the eighth aspect is another aspect of the relationship between the marginal area and the face, the "lower side" may be, for example, a side (chin direction) opposite to the head top direction.

In any one of the sixth to eighth aspects, in the printer according to a ninth aspect, in a case where the subject detection unit detects faces of a plurality of persons and a difference between directions of the faces of the plurality of persons is within an allowable range, the image rotation unit rotates the received image. Since it is assumed that the ninth aspect is a process in a case where the directions of the faces of the plurality of person are different within the allowable range, a direction of a line acquired by connecting a head top and a chin may be used as a "direction of the face", and thus, a "difference between the directions of the faces" may be determined by an angle formed by these lines. In the ninth aspect, the image may be rotated with any direction of the faces as its reference, or may be rotated with a direction (for example, an average of the directions of the plurality of faces) calculated from the directions of the plurality of faces as its reference.

In any one of the sixth to eighth aspects, in the printer according to a tenth aspect, in a case where the subject detection unit detects faces of a plurality of persons and a difference between directions of the faces of the plurality of persons exceeds an allowable range, the image rotation unit does not rotate the received image. For example, since it is assumed that the tenth aspect is a process in a case where the directions of the faces of the plurality of persons exceed the allowable range and are different from each other, the process of the tenth aspect may be performed in a case where it is hard to see another face if the image is rotated so as to match any face. In the tenth aspect, the "direction of the face" and the "difference between the directions of the faces" may be assumed similarly to the ninth aspect.

In any one of the sixth to tenth aspects, the printer according to an eleventh aspect further comprises: a trimming unit that trims off a part of an area excepting the detected face of the person in the rotated image. The print unit prints the trimmed image. According to the eleventh aspect, it is possible to acquire the print on which the face of the person occupies most of the image forming area. A degree of trimming (the extent to which an area other than the face of the person is trimmed off) may be automatically set, or may be set by the user's operation. In a case where an image smaller than the image forming area is acquired through the trimming, the image may be expanded so as to be equal to the size of the image forming area. The trimming result may be displayed on the display device before the image is printed, and thus, the user may check the trimming result.

In the eleventh aspect, the printer according to a twelfth aspect further comprises: a storage unit that stores information indicating content of the rotation and/or the trimming in association with the received image. According to the twelfth aspect, the stored content is read out, and thus, it is possible to acquire the print on which the content of the rotation or the trimming is realized. The information may be recorded in the header of the image in order to associate the image with the information, and the image and the information may be linked as separate files.

In any one of the first to twelfth aspects, in the printer according to a thirteenth aspect, the instant film is a self-development type instant film that includes a developer pod formed in the marginal area, and the print unit transports the self-development type instant film such that the developer pod is in the front in a case where the image is printed. Since the thirteenth aspect is a configuration example of the instant film, the instant film is ejected from between the pair of spreading rollers after the exposure process is performed on the image forming area, and thus, the developer pod is extruded. Thereafter, the contained developer spreads.

In order to achieve the above-described object, a camera with a printer according to a fourteenth aspect comprises: the printer according to any one of the first to thirteenth; an image pickup optical system; and an imaging element that outputs a signal representing an optical image of the subject formed by the image pickup optical system. The image input unit receives an image generated based on the output signal. According to the fourteenth aspect, it is possible to print on which the image captured by the camera is printed such that the marginal area of the instant film is positioned in the desired direction with respect to the subject.

In order to achieve the above-described object, a printing method according to a fifteenth aspect of the present invention is a printing method of printing an image on an instant film having an image forming area and a marginal area which is formed in one side and wider than other marginal areas in other sides and is an area different from the image forming area. The method comprises: an image input process of inputting an image; a subject detection process of detecting a subject from the received image; an image rotation process of rotating the received image according to an orientation of the detected subject such that the marginal area is positioned in a specific direction with respect to the subject in a case where the rotated image is printed on the instant film; and an image printing process of printing the rotated image on the instant film. According to the fifteenth aspect, similarly to the first aspect, it is possible to acquire the print on which the marginal area is positioned in the desired direction with respect to the subject in a case where the image is printed by using the instant film having the image forming area and the marginal area. The user fills out the message in such a marginal area, and thus, it is possible to acquire the print having a good appearance.

The fifteenth aspect may have the same configuration as that of the second to fifteenth aspects. A program causing an image processing device such as a personal computer, a smartphone, or a printer to perform the method according to these aspects and a non-transitory recording medium having a computer-readable code of the program recorded thereon may be applied to aspects of the present inventions.

As described above, according to the printer, the camera with a printer, and the printing method of the present invention, it is possible to acquire the print on which the marginal area is positioned in the desired direction with respect to the subject in a case where the image is printed by using the instant film having the image forming area and the marginal area.

BRIEF DESCRIPTION OF THE DRAWINGS

FIGS. 18A to 18C are diagrams for describing another Example 1 of the image rotation.

DESCRIPTION OF THE PREFERRED EMBODIMENTS

Hereinafter, embodiments of a printer, a camera with a printer, and a printing method according to the present invention will be described in detail with reference to the accompanying drawings.

First Embodiment

Digital Camera with Printer
External Appearance Configuration

FIGS. 1 to 4 are a front perspective view, a rear perspective view, a front view, and a rear view showing a digital camera with a printer 1 (a printer, a camera with a printer, and an image input unit) according to a first embodiment, respectively.

Figure 1:
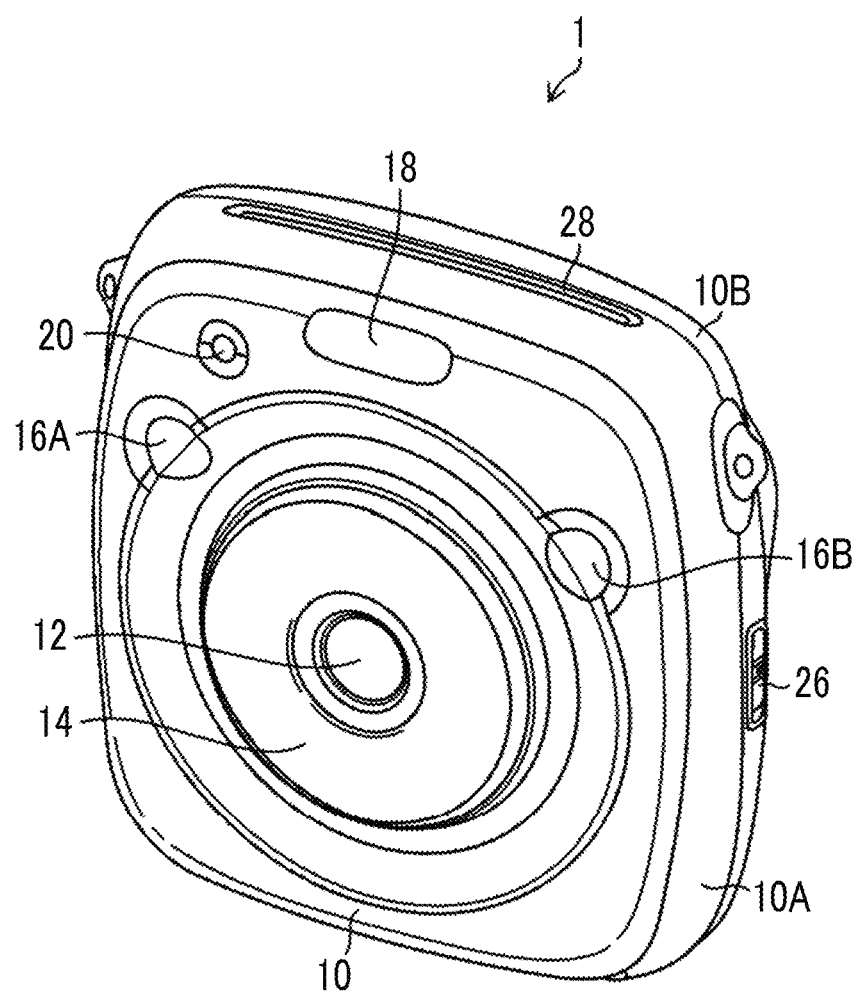
FIG. 1 is a front perspective view showing a digital camera with a printer according to a first embodiment.
Figure 2:
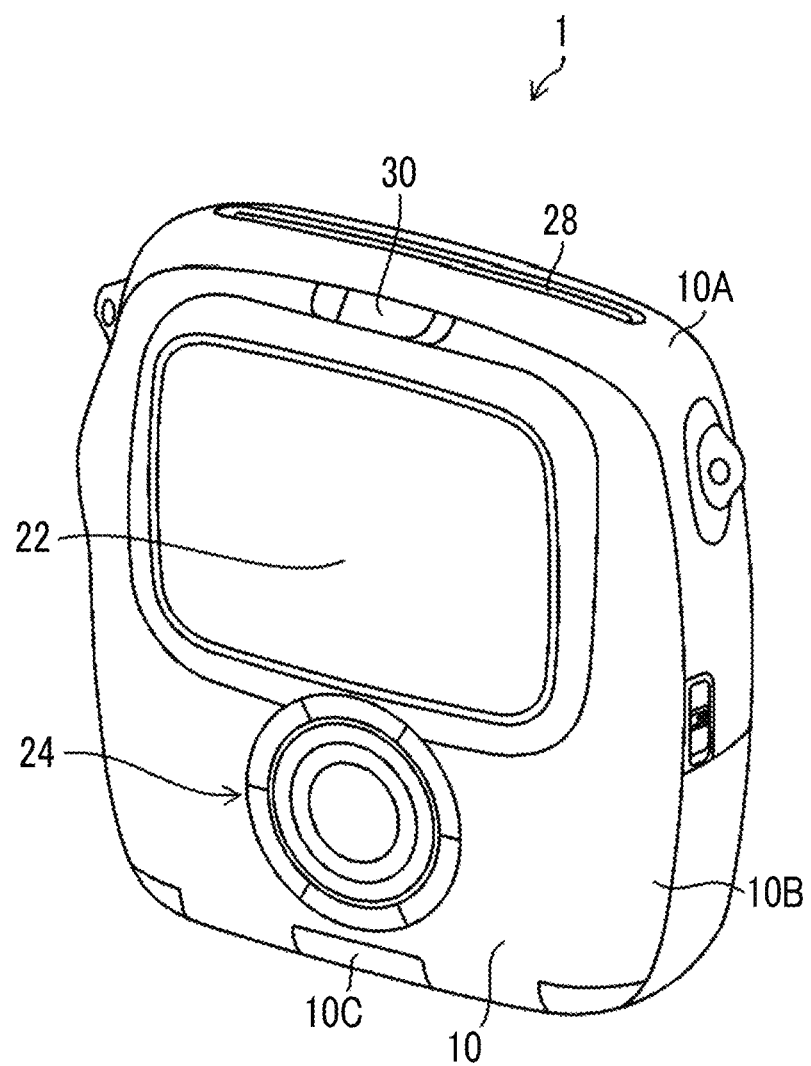
FIG. 2 is a rear perspective view showing the digital camera with a printer according to the first embodiment.
Figure 3:
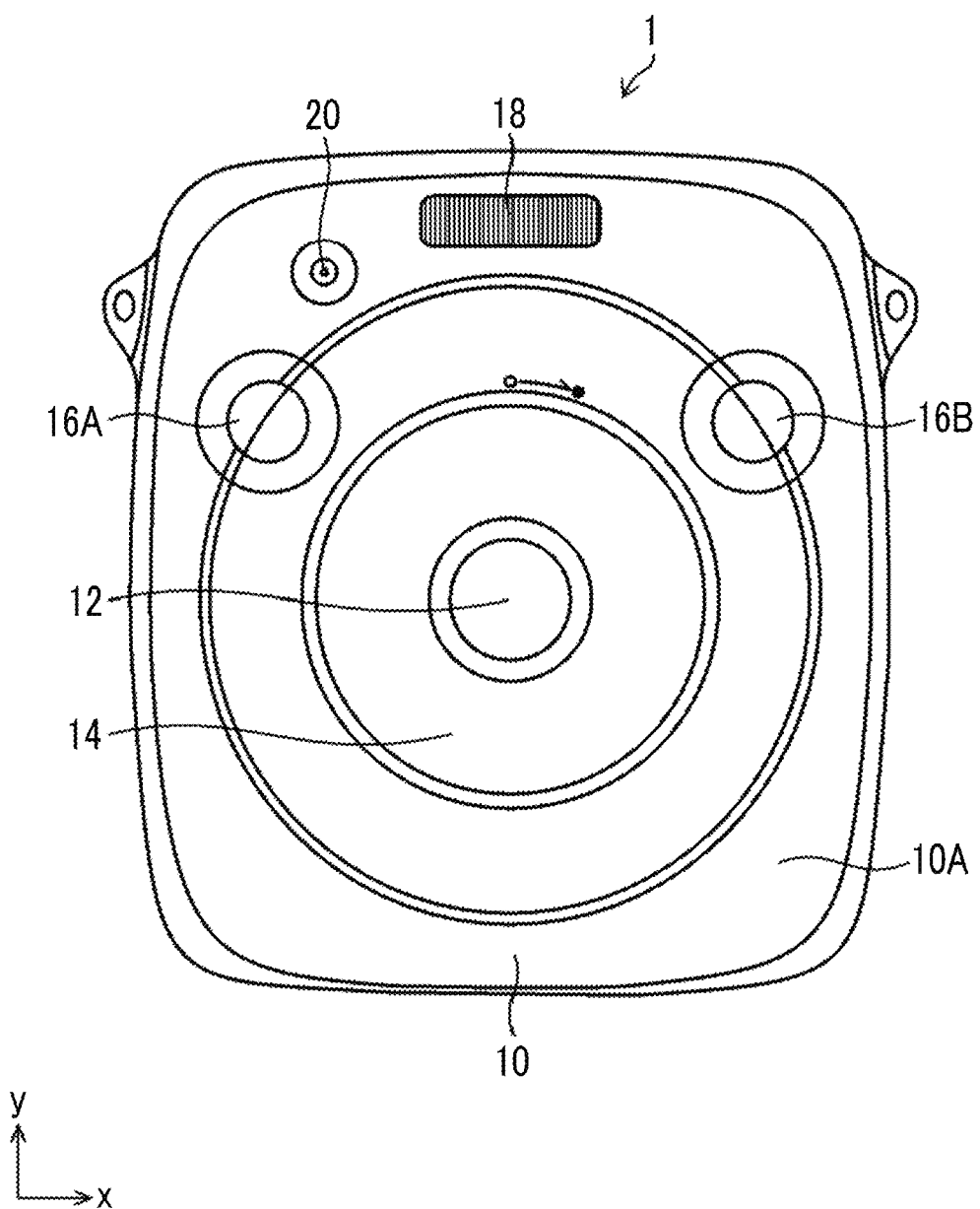
FIG. 3 is a front view showing the digital camera with a printer according to the first embodiment.
Figure 4:
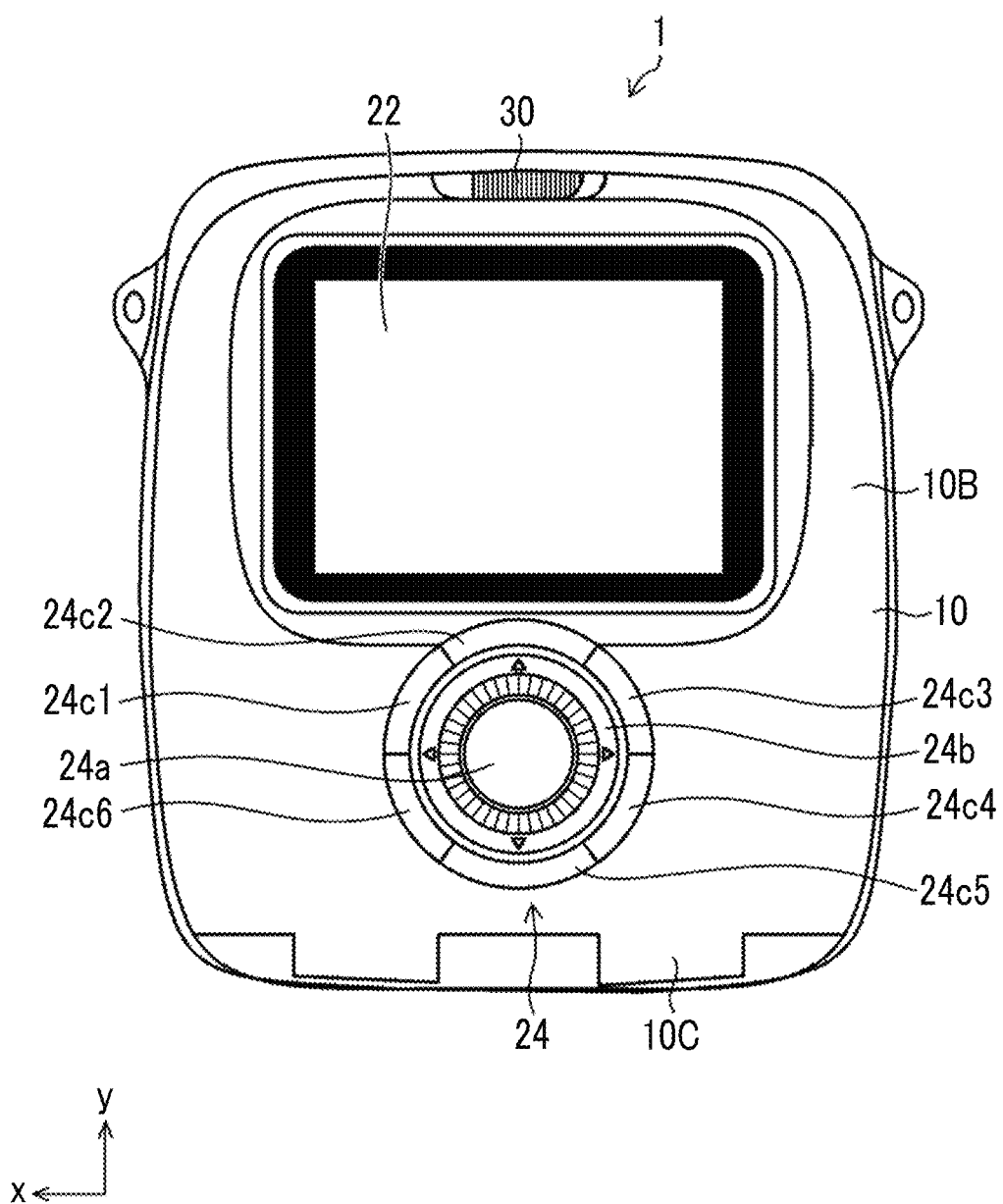
FIG. 4 is a rear view showing the digital camera with a printer according to the first embodiment.

A digital camera with a printer 1 shown in FIGS. 1 to 4 is a digital camera with a printer that uses an instant film as a medium for printing. In FIGS. 3 and 4, it is assumed that a direction represented by an arrow x is a leftward and rightward direction and a direction represented by an arrow y is an upward and downward direction. The leftward and rightward direction is a synonym for a horizontal direction or a width direction. The upward and downward direction is a synonym for a height direction.

The digital camera with a printer 1 includes a portable camera body 10. The camera body 10 includes an imaging lens 12, a power ring 14, a first release button 16A, a second release button 16B, a flash 18, and an auxiliary light lamp 20 which are provided in the front. The camera body 10 includes a monitor 22 and a rear operation unit 24 which are provided at the rear. The camera body 10 includes a capturing mode switching lever 26 which is provided on the left side and a print ejection port 28 which is provided at the top.

Camera Body

The camera body 10 has a rounded flat block shape as a whole. The camera body 10 has a bilaterally symmetrical shape as a whole so as to be gripped with either of the left and right hands.

The camera body 10 includes a main body 10A and a back cover 10B. The back cover 10B constitutes the rear of the camera body 10, and is provided so as to be opened and closed with respect to the main body 10A through a hinge 10C. A back cover locking mechanism that locks the back cover 10B is provided at the main body 10A. In a case where the back cover is closed, the back cover 10B is automatically locked by the back cover locking mechanism. The back cover is unlocked by a sliding type unlocking lever 30 provided at the back cover 10B. However, the unlocking lever is not able to be operated during the printing. That is, the unlocking lever is forcibly locked such that the back cover 10B is not opened during the printing.

Imaging Lens

The imaging lens 12 (image pickup optical system) is arranged in a substantially central position in the front of the camera body 10. The imaging lens 12 is a unifocal lens.

Power Ring

The power ring 14 is an operation member that powers on and off the digital camera with a printer 1. The power ring 14 has a ring shape, and is arranged on the same axis as that of the imaging lens 12. The power ring 14 is rotated around the imaging lens 12, and powers on and off the digital camera with a printer 1. Since a movable range of the power ring 14 is restricted, the power of the digital camera with a printer 1 is powered on in a case where the power ring rotates up to one end of the movable range, and the power of the digital camera with a printer 1 is powered off in a case where the power ring rotates up to the other end of the movable range.

First Release Button and Second Release Button

The first release button 16A and the second release button 16B are examples of a capturing instruction unit, and operation members for transmitting an instruction to capture an image. The first release button 16A and the second release button 16B are provided in the front of the camera body 10, and are arranged so as to be bilaterally symmetric with respect to each other. The first release button 16A and the second release button 16B are so-called two-stage stroke type push buttons capable of being "half push" operated (an operation of pushing the stroke halfway) and "fully push" operated (an operation of fully pushing the stroke). The digital camera with a printer 1 performs capturing preparation by operating the half push of the first release button 16A or the second release button 16B, and performs actual capturing by operating the fully push of the first or second button. The actual capturing is capturing for recording an image.

Flash

The flash 18 is provided in the front of the camera body 10, and is arranged substantially directly above the imaging lens 12. The flash 18 is a xenon tube.

Auxiliary Light Lamp

The auxiliary light lamp 20 is a lamp that emits auxiliary light for autofocus (AF). The auxiliary light lamp 20 emits the light in a case where capturing is performed under a dark environment, and is used as the auxiliary light for AF. The auxiliary light lamp 20 is a light-emitting diode (LED), and is provided in the front of the camera body 10.

Monitor

The monitor 22 is an example of a display device. The monitor 22 is a color liquid crystal display, and is provided at the rear of the camera body 10. The monitor 22 is a so-called wide monitor, and includes a horizontally long screen.

Rear Operation Unit

The rear operation unit 24 includes a menu button 24a, a command dial 24b, and six function buttons 24c1 to 24c6. The menu button 24a, the command dial 24b, and the six function buttons 24c1 to 24c6 are arranged so as to be concentric, and constitute a circular operation unit as a whole. The rear operation unit 24 is provided at the rear of the camera body 10. Both the monitor 22 and the rear operation unit 24 are arranged in the center at the rear of the camera body 10 in the width direction, and are vertically arranged.

Menu Button

The menu button 24a is a button for calling a menu screen on the monitor 22, and is a circular push button. The menu button 24a is arranged in the center of the rear operation unit 24. The menu button 24a is pushed, and thus, the menu screen is displayed on the monitor 22.

The menu button 24a also functions as an OK button. The OK button is a button for transmitting an instruction to input OK for an inquiry. In a case where the image is desired to be printed, the user inputs OK by pushing the menu button 24a, and confirms the print instruction.

Command Dial

The command dial 24b is a ring-shaped touch sensor, and is rotated by tracing the surface thereof along the circle. The command dial 24b also functions as a cross key, and is able to be pushed in four upward, downward, leftward, and rightward directions.

The command dial 24b is arranged on the same axis as that of the menu button 24a, and is arranged in an outer circumference of the menu button 24a.

Function Buttons

The six function buttons 24c1 to 24c6 are arranged in the same circumference, and constitute one circle as a whole. The buttons have the same shape, and have a shape in which the ring is equally split into six. Each button is a push button.

The function button 24c1 functions as a vignetting button. The vignetting button is a button for calling a function of performing a vignetting process on an image. The vignetting process is a process of reducing the brightness at an edge part of the image.

The function button 24c2 functions as an effect button. The effect button is a button for calling a function of performing an effect process on an image. The effect process is a process of giving a certain effect to the image, and corresponds to, for example, a process of changing the tone of the image or blurring the image.

The function button 24c3 functions as a brightness button. The brightness button is a button for calling a function of changing the brightness of an image.

The function button 24c4 functions as a print button. The print button is a button for transmitting an instruction to print an image being displayed on the monitor 22.

The function button 24c5 functions as a back button. The back button is a button for transmitting an instruction to return the image in an immediately previous state. Since the image is returned to the immediately previous state, the back button also functions as a button for transmitting an instruction to cancel the selection or the instruction, that is, a cancellation button.

The function button 24c6 functions as a playback button. The playback button is a button for transmitting an instruction to switch the digital camera with a printer to a playback mode. In a case where the function button 24c6 is pushed in a state in which the operation mode is set to the capturing mode, the operation mode is switched to the playback mode.

The switching from the playback mode to the capturing mode is performed by the first release button 16A and the second release button 16B. That is, in a case where the first release button 16A or the second release button 16B is pushed in a state in which the operation mode is set to the playback mode, the operation mode is switched to the capturing mode.

Capturing Mode Switching Lever

The capturing mode switching lever 26 is an example of a capturing mode switching unit, and is an operation member for switching the capturing mode. The capturing mode switching lever 26 is a sliding type switch, and is provided on the left side of the camera body 10. The capturing mode switching lever 26 is operated to be slid, and the capturing mode is set to an "auto mode" in a case where the capturing mode switching lever is set in an "auto position". The capturing mode is set to a "manual mode" in a case where the capturing mode switching lever is set in a "manual position".

In a case where an image is captured in the auto mode, the printing process is immediately performed. Meanwhile, in a case where the image is captured in the manual mode, the captured image is displayed on the monitor 22, and the printing process is performed after the print instruction is waited. The details thereof will be described below.

Print Ejection Port

The print ejection port 28 is an ejection port of the printed instant film. The print ejection port 28 is a slit through which the instant film 110 is able to pass, and is provided in the center at the top of the camera body 10 in the width direction. An instant film 110 is ejected directly upwards from the print ejection port 28.

Internal Mechanical Configuration

Figure 5:
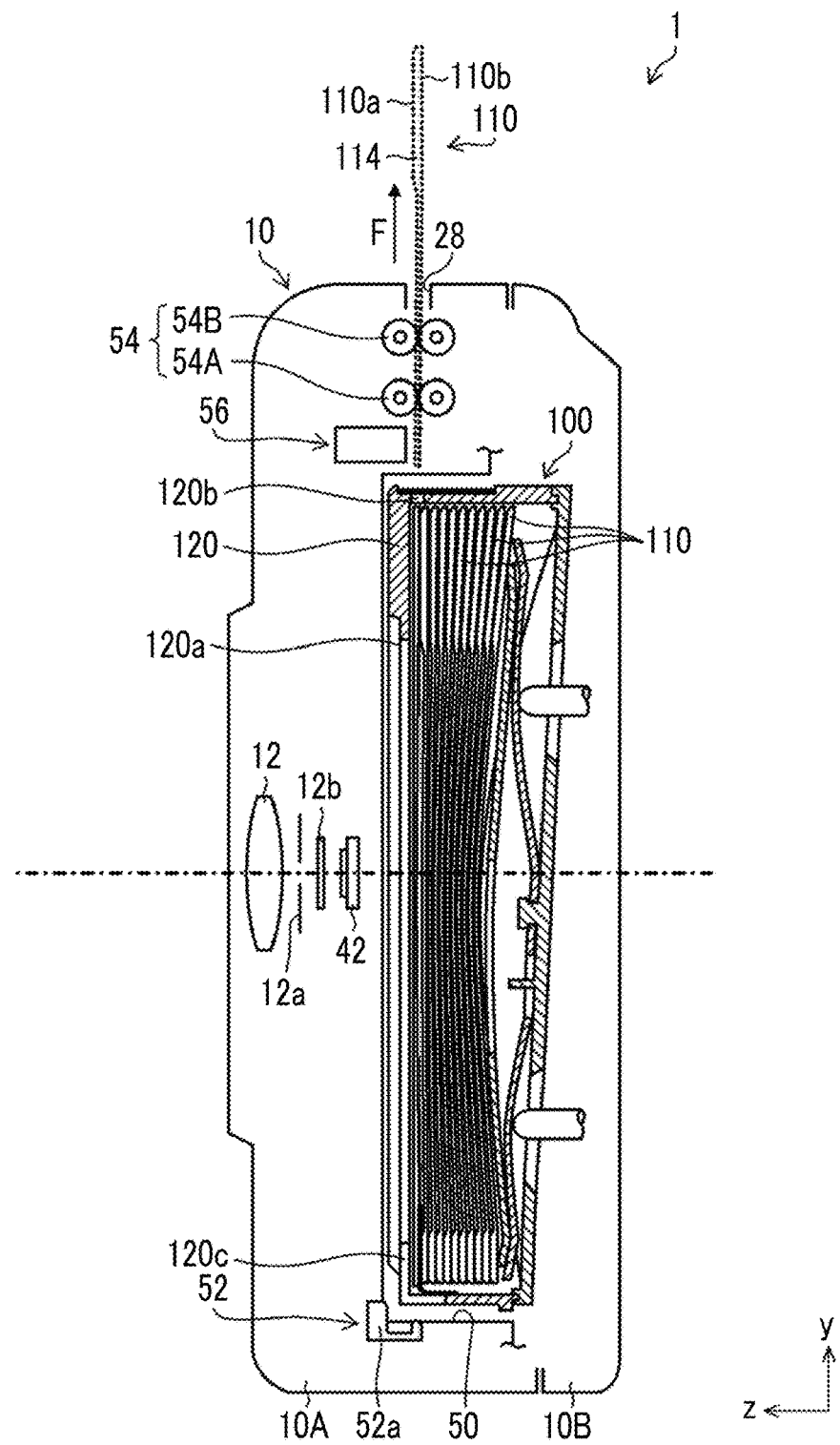
FIG. 5 is a front view showing an internal mechanical configuration of the digital camera with a printer according to the first embodiment.

FIG. 5 is a diagram showing an internal mechanical configuration of the digital camera with a printer 1. FIG. 5 shows only the configuration of main units. It is assumed in FIG. 5 that a direction represented by an arrow z is a thickness direction.

As the configuration related to the digital camera, the imaging lens 12 (image pickup optical system) and the image sensor 42 (imaging element) are provided within the digital camera with a printer 1, and an optical image of a subject is formed on the image sensor by the imaging lens 12. As the configuration related to the printer, an instant film pack 100, a film loading room 50, a film delivery mechanism 52, a film transport mechanism 54, and a print head 56 are provided.

Configuration Related to Digital Camera

Imaging Lens

The imaging lens 12 is constituted by a plurality of lenses including a focus lens. In FIG. 5, only one lens is shown for simplicity of illustration. A focal length of the imaging lens 12 is adjusted by moving the focus lens back and forth along an optical axis.

A stop 12a and a shutter 12b are provided in the imaging lens 12. The light amount of light passing through the imaging lens 12 is adjusted by the stop 12a. The light passing through the imaging lens 12 is shielded by the shutter 12b.

Image Sensor

For example, the image sensor 42 is a two-dimensional solid image pickup element such as a charge coupled device (CCD) image sensor or a complementary metal oxide semiconductor (CMOS) image sensor, and outputs a signal indicating the optical image of the subject formed by the imaging lens 12. The image sensor 42 includes an image pickup area having an aspect ratio corresponding to an exposure area of the instant film to be used.

Configuration Related to Printer

Instant Film Pack

The instant film pack 100 has a structure in which a plurality of instant films 110 is accommodated in a case 120.

Figure 6:
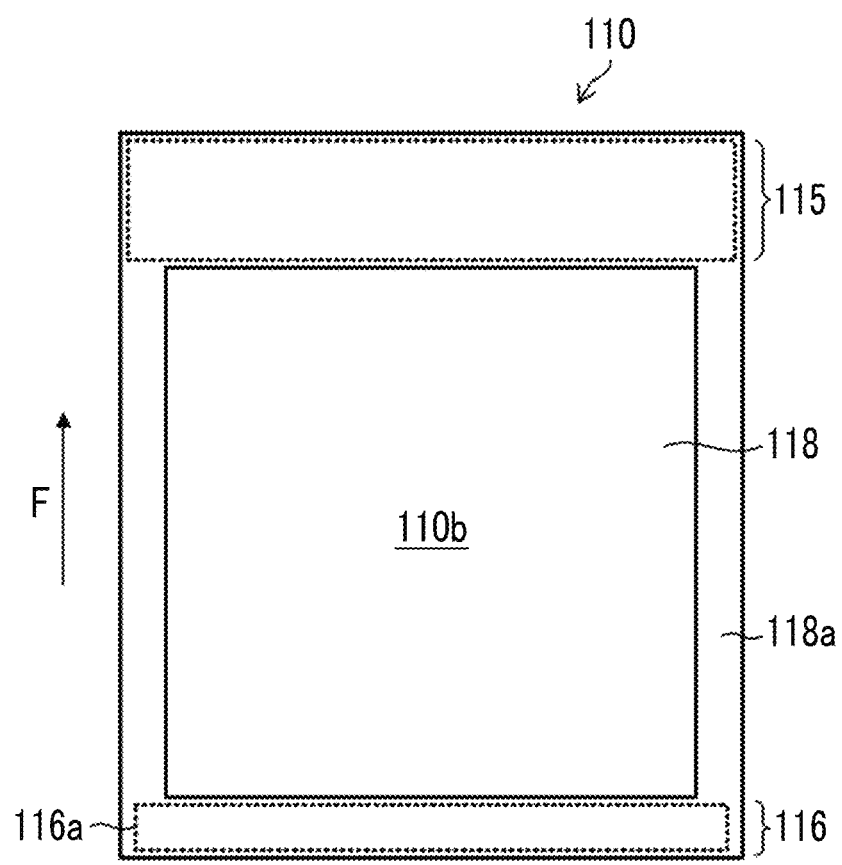
FIG. 6 is a front view of an instant film.
Figure 7:
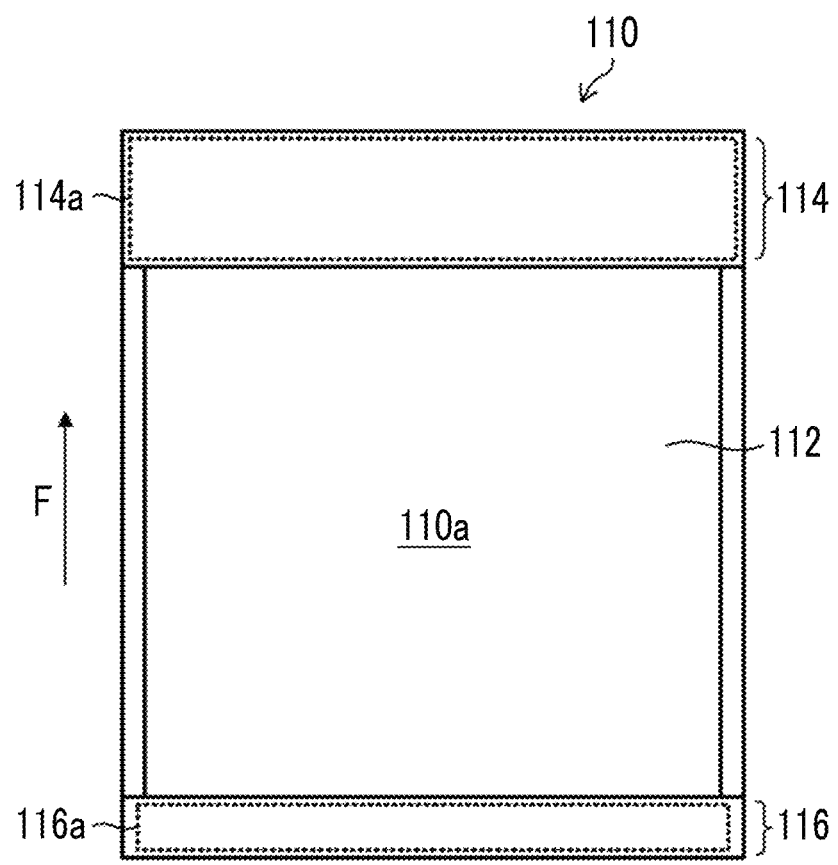
FIG. 7 is a rear view of the instant film.

FIG. 6 is a front view of the instant film 110. FIG. 7 is a rear view of the instant film 110.

In FIGS. 6 and 7, a direction represented by an arrow F is a utilization direction of the instant film 110. That is, the instant film 110 is transported toward the direction represented by the arrow F, and the instant film 110 is used. Accordingly, in a case where the instant film is loaded into the digital camera with a printer 1, the direction represented by the arrow F is an ejection direction of the instant film 110.

The instant film 110 is a self-development type instant film having a rectangular card shape. The instant film 110 includes an exposure surface 110a which is a rear surface and an observation surface 110b which is a front surface. The exposure surface 110a is a surface on which an image is recorded through exposure, and the observation surface 110b is a surface through which the recorded image is observed.

As shown in FIG. 6, an observation part 118 is provided on the observation surface 110b of the instant film 110. The observation part 118 is a part (image forming area) in which the image is displayed. The image is displayed on the observation part 118 by performing a development treatment on the exposure part 112 (see FIG. 7). The observation part 118 is arranged so as to correspond to the exposure part 112. A frame 118a is provided around the observation part 118, and the image is displayed within the frame 118a (image forming area). An aspect ratio of the observation part 118 is 1:1 which is the same as that of the exposure part 112, and has a square shape. On the observation surface 110b, an area of which a width is wide in a transport direction, which exists on one side (front side in the transport direction) of the instant film 110 in an area different from an area in which the pod part 114 (see FIG. 7; developer pod) is arranged on a rear surface, that is, an image forming area of the observation surface 110b, is a marginal area 115, and the user can fill out a message in the marginal area 115 as will be described below.

As shown in FIG. 7, an exposure part 112, a pod part 114, and a trap part 116 are provided on the exposure surface 110a of the instant film 110.

The exposure part 112 is a part in which an image is recorded through exposure. The pod part 114 and the trap part 116 are arranged on front and rear sides with the exposure part 112 interposed therebetween. The instant film 110 of the first embodiment includes a square-shaped exposure part 112 of which an aspect ratio is 1:1.

The pod part 114 is arranged on the front side of the exposure part 112 in the direction of the arrow F. A development treatment liquid pod 114a that contains a development treatment liquid is provided within the pod part 114. In the first embodiment, an area of the pod part 114 on the observation surface 110b is the marginal area 115.

The trap part 116 is arranged on the rear side of the exposure part 112 in the direction of the arrow F. An absorbing material 116a of the development treatment liquid is provided within the trap part 116.

In a general case, the instant film 110 is printed in an orientation in which the trap part 116 is positioned on an upper side of the image and the pod part 114 is positioned on a lower side of the image (see FIG. 11), the image is observed in an orientation (an opposite orientation in a case where the image is printed) in which the trap part 116 is positioned on the upper side and the pod part 114 is positioned on the lower side. However, the image is rotated and printed according to the instruction of the user as will be described below. Whether the trap part 116 or the pod part 114 is positioned on the upper side of the image (whether the marginal area is positioned on the upper side or the lower side of the image) in an initial state (a state in which the instruction of the user is not input) in a case where the image is printed may be set by the operation of the rear operation unit 24.

The development treatment liquid of the pod part 114 spreads over the exposure part 112 after the exposure, and thus, the development treatment is performed on the instant film 110. The instant film 110 passes between roller pairs, and thus, the development treatment liquid of the pod part 114 is extruded from the pod part 114 and spreads over the exposure part 112. The development treatment liquid remaining after the spreading is trapped in the trap part 116.

The case 120 has a rectangular box shape. The case 120 includes an opening 120a for exposure which is provided in the front, and includes a slit-shaped ejection port 120b which is provided at the top. The instant films 110 are accommodated so as to overlap each other within the case 120 in a state in which the exposure surface 110a faces the front of the case 120 and the pod part 114 faces the top of the case 120.

The case 120 includes a slit-shaped claw opening 120c in the bottom. A claw 52a enters the claw opening 120c, and thus, the instant films 110 accommodated in the case 120 are sent toward the ejection port 120b one by one, and are ejected from the ejection port 120b.

Ten instant films 110 are accommodated in one instant film pack 100.

Film Loading Room

The film loading room 50 is provided as a recess part capable of accommodating the instant film pack 100 in the main body 10A of the camera body 10. In a case where the back cover 10B of the camera body 10 is opened, the film loading room 50 is exposed, and the instant film pack 100 is able to be loaded.

Film Delivery Mechanism

The film delivery mechanism 52 delivers the instant films 110 from the instant film pack 100 loaded into the film loading room 50 one by one. The film delivery mechanism 52 includes a claw 52a that moves back and forth along a delivery direction of the instant film 110. The instant films 110 within the case 120 are extracted by the claw 52a one by one, and the instant film 110 is delivered from the instant film pack 100.

Film Transport Mechanism

The film transport mechanism 54 transports the instant film 110 delivered from the instant film pack 100 by the film delivery mechanism 52 at a certain speed. The film transport mechanism 54 includes a transport roller pair 54A and a spreading roller pair 54B.

The transport roller pair 54A is rotated by being driven by a motor (not shown), and transports the instant film while clamping both sides of the instant film 110.

The spreading roller pair 54B is rotated by being driven by a motor (not shown), and transports the instant film 110 while clamping the entire instant film. The pod part 114 of the instant film 110 is pushed during the transporting, and the development treatment liquid spreads.

Print Head

The print head 56 records an image on the instant film 110 delivered from the instant film pack 100. The print head 56 is a line-type exposure head. The print head 56 irradiates the exposure surface 110a of the instant film 110 transported by the film transport mechanism 54 with print light for every line, and records the image on the instant film 110 in one pass.

In the digital camera with a printer 1 of the first embodiment, the film delivery mechanism 52, the film transport mechanism 54, and the print head 56 constitute a print unit.

Electric Configuration

Figure 8:
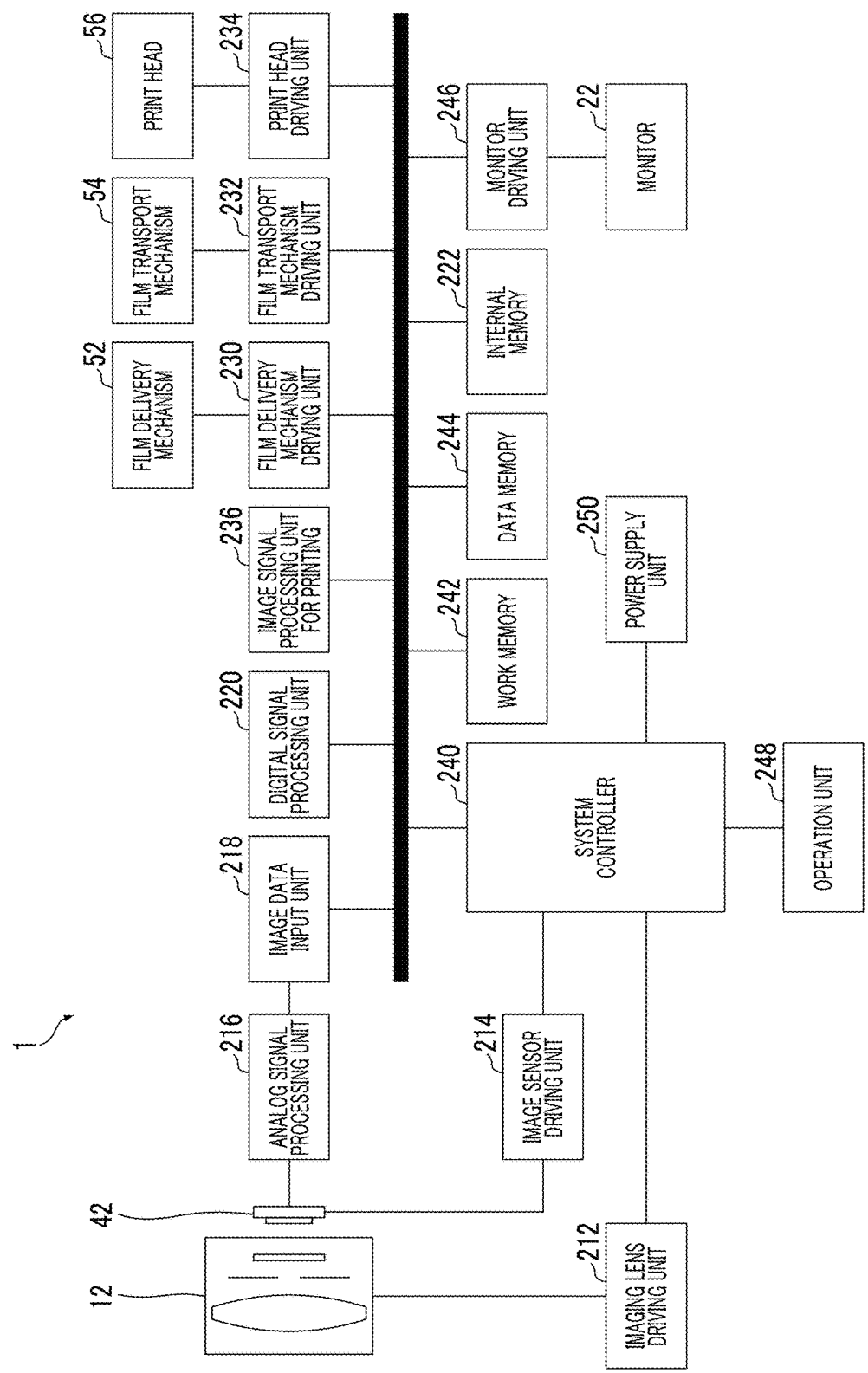
FIG. 8 is a diagram showing an electric configuration of the digital camera with a printer according to the first embodiment.

FIG. 8 is a diagram showing an electric configuration of the digital camera with a printer 1. FIG. 8 shows only the configuration of main units.

As the configuration related to the digital camera, the digital camera with a printer 1 includes the imaging lens 12, an imaging lens driving unit 212, the image sensor 42, an image sensor driving unit 214, an analog signal processing unit 216, an image data input unit 218, a digital signal processing unit 220, and an internal memory 222. As the configuration related to the printer, the digital camera with a printer includes the film delivery mechanism 52, a film delivery mechanism driving unit 230, the film transport mechanism 54, a film transport mechanism driving unit 232, the print head 56, a print head driving unit 234, and an image signal processing unit 236 for printing. As the configuration common to the digital camera and the printer, the digital camera with a printer includes a system controller 240, a work memory 242, a data memory 244, the monitor 22, a monitor driving unit 246, an operation unit 248, and a power supply unit 250. The system controller 240 (an image input unit, an image rotation unit, the print unit, a display control unit, and a trimming unit) controls these elements.

Configuration Related to Digital Camera

Imaging Lens Driving Unit

The imaging lens driving unit 212 is driving means of the imaging lens 12. The imaging lens driving unit 212 drives the focus lens, the stop 12a, and the shutter 12b. The imaging lens driving unit 212 drives the imaging lens 12 under the control of the system controller 240.

Image Sensor Driving Unit

The image sensor driving unit 214 is driving means of the image sensor 42. The image sensor driving unit 214 drives the image sensor 42 under the control of the system controller 240.

Analog Signal Processing Unit

The analog signal processing unit 216 receives a signal output from the image sensor 42, converts the received signal into a digital image signal by performing signal processing such as correlative double sampling processing or amplification processing on the received signal, and outputs the converted digital image signal.

Image Data Input Unit

The image data input unit 218 (image data input unit) receives the digital image signal output from the analog signal processing unit 216 under the control of the system controller 240. One received image data item is stored in the work memory 242.

Digital Signal Processing Unit

The digital signal processing unit 220 performs signal processing such as demosaicing, white balance correction, gamma correction, or contour correction on the image data stored in the work memory 242, and generates image data including luminance data (Y data) and color difference data items (Cr and Cb data items).

The digital signal processing unit 220 processes the image data under the control of the system controller 240.

Internal Memory

The internal memory 222 (storage unit) stores the image acquired through the capturing. The internal memory 222 stores information indicating the content of the trimming and/or rotation of the image in association with the image. For example, the internal memory 222 is a non-volatile memory such as an electrically erasable programmable read only memory (EEPROM). The image and information stored in the internal memory 222 may be recorded in a recording medium such as a memory card by an interface unit (not shown). The image and information recorded in the memory card may be input through the interface unit, and may be used in the rotation, trimming, printing of the image to be described below.

Configuration Related to Printer

Film Delivery Mechanism Driving Unit

The film delivery mechanism driving unit 230 is driving means of the film delivery mechanism 52. The film delivery mechanism driving unit 230 drives the claw 52a under the control of the system controller 240.

Film Transport Mechanism Driving Unit

The film transport mechanism driving unit 232 is driving means of the film transport mechanism 54. The film transport mechanism driving unit 232 drives the transport roller pair 54A and the spreading roller pair 54B such that these roller pairs are rotated according to a command from the system controller 240.

Print Head Driving Unit

The print head driving unit 234 is driving means of the print head 56. The print head driving unit 234 drives the print head 56 under the control of the system controller 240.

Image Signal Processing Unit for Printing

The image signal processing unit 236 (a subject detection unit, the image rotation unit, the trimming unit, and the print unit) for printing generates image data for printing under the control of the system controller 240. The image data for printing is image data to be recorded on the instant film 110 by the print head 56. The print head 56 is driven based on the image data for printing generated by the image signal processing unit 236 for printing, and records the image on the instant film 110. The image signal processing unit 236 for printing performs subject detection, image rotation, and trimming under the control of the system controller 240.

Configuration Common to Digital Camera and Printer

System Controller

The system controller 240 controls the entire digital camera with a printer 1. The system controller 240 is a computer, and provides various functions by executing various programs (including a program for executing a printing method according to the present invention).

Work Memory

The work memory 242 is a memory for working. For example, the work memory 242 is a synchronous dynamic random access memory (SDRAM).

Data Memory

The data memory 244 is a memory that stores a program for controlling, and various data items required in the controlling. The data memory 244 is a non-volatile memory such as EEPROM.

Monitor Driving Unit

The monitor driving unit 246 (display control unit) is driving means of the monitor 22. The monitor driving unit 246 drives the monitor 22 under the control of the system controller 240.

Operation Unit

The operation unit 248 includes the power ring 14, the first release button 16A, the second release button 16B, the rear operation unit 24, and the capturing mode switching lever 26. The operation unit 248 outputs a signal corresponding to an operation of each operation member to the system controller 240.

Power Supply Unit

The power supply unit 250 supplies power to the units under the control of the system controller 240. The power supply unit 250 includes a battery as a power supply and a power supply circuit.

Action

The digital camera with a printer 1 has, as the operation mode, the capturing mode and the playback mode. The digital camera with a printer 1 may capture the image, and may record the captured image in the internal memory 222 by setting the digital camera with a printer in the capturing mode. The digital camera with a printer is set in the playback mode, and thus, it is possible to play the image recorded in the internal memory 222. In a case where the digital camera with a printer is set in the capturing mode, it is possible to immediately print the captured image, and in a case where the digital camera with a printer is set in the playback mode, it is possible to print the image being played.

Capturing Mode

The digital camera with a printer 1 is activated in the state of the capturing mode in a case where the digital camera with a printer is powered on. As the capturing mode, there are the auto mode and the manual mode. The switching between the auto mode and the manual mode is performed by the capturing mode switching lever 26. In a case where the image is captured in the auto mode, the printing process is immediately performed. Meanwhile, in a case where an image is captured in the manual mode, the captured image is displayed on the monitor 22, and the printing process is performed after the print instruction is waited.

General Printing

Figure 9:
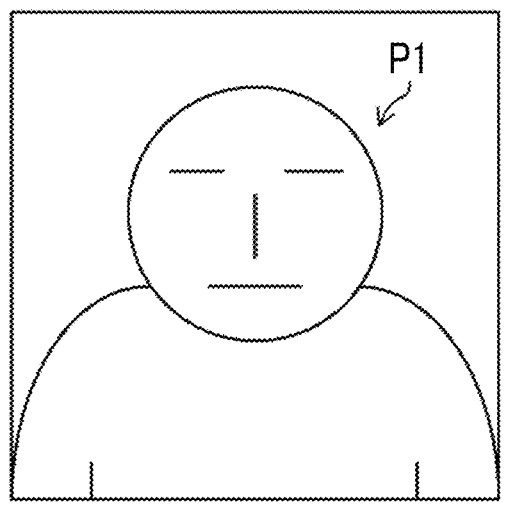
FIG. 9 is a diagram for describing general printing.
Figure 10A:
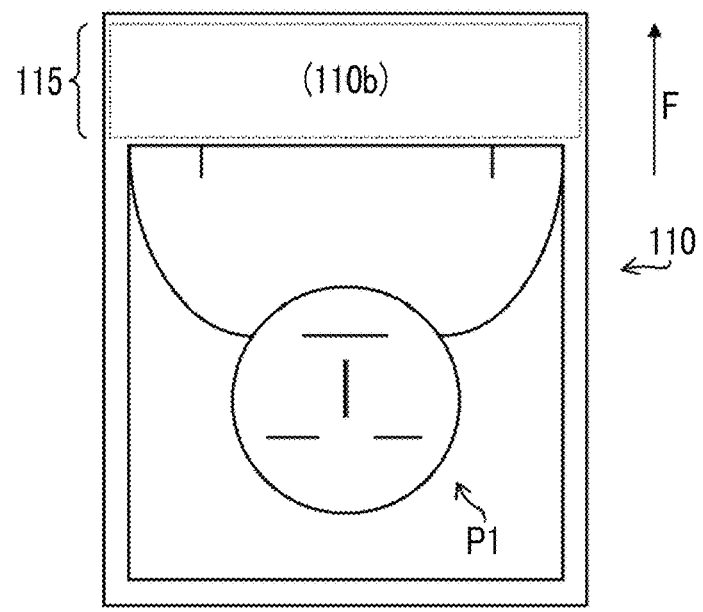
FIGS. 10A and 10B are another diagrams for describing the general printing.
Figure 10B:
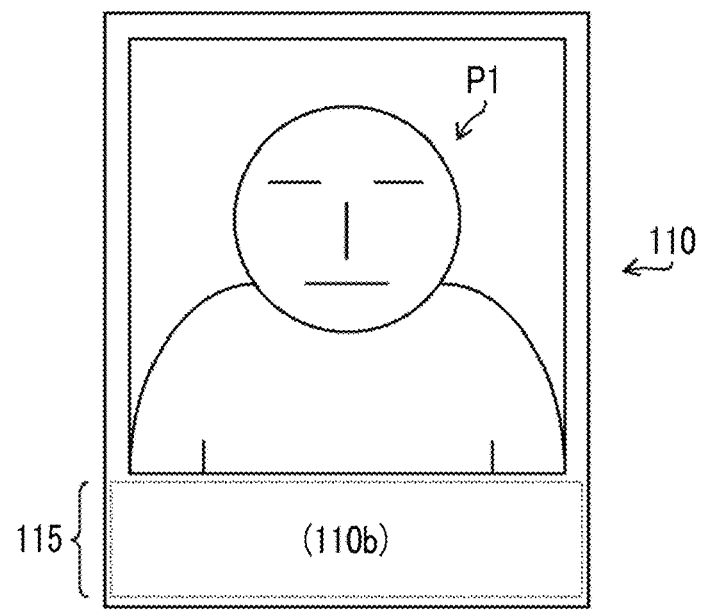
Figure 11:
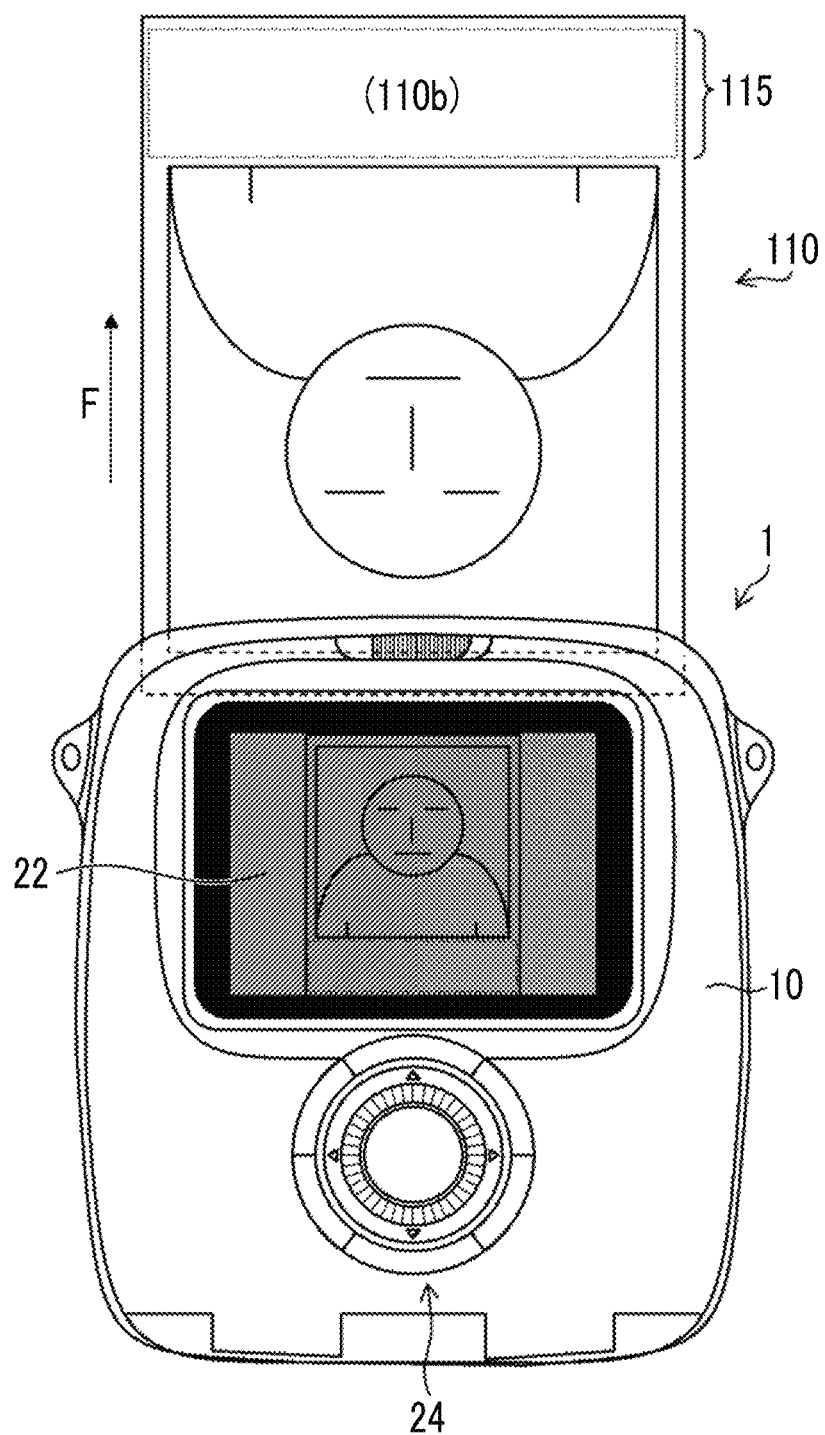
FIG. 11 is still another diagram for describing the general printing.

In this case, the relationship between the subject and the marginal area in general printing (in a case where the rotation of the image using the printing method of the present invention is not performed) will be described. Hereinafter, it is assumed that the subject is a person P1 as shown in FIG. 9, and it is assumed in the upward and downward direction of the face of the person P1 matches the upward and downward direction of the digital camera with a printer 1. In a case where such a person P1 is captured, the image is printed in the general printing as shown in FIG. 10A, and the image is observed in an orientation as shown in FIG. 10B. That is, the instant film 110 is transported such that the marginal area 115 (an area of the observation surface 110b in which the pod part 114 is positioned on the rear surface) is at the front in the transport direction (arrow F) (see FIGS. 10A and 11). In FIG. 11, a paper surface is the observation surface 110b, and a surface opposite to the paper surface is the exposure surface 110a. Accordingly, in the general printing (in the state of FIGS. 10A to 11), the marginal area 115 is under the person P1 in a case where the image is observed. In FIG. 11, a print image (an image acquired by arranging the image to be printed and the marginal area according to the rotation of the image) is displayed on the monitor 22. Although it has been described in FIG. 11 that the print image of which the brightness is lowered is displayed, the saturation thereof may be lowered.

In a case where the user fills out the message in the marginal area 115 of the print, the message is on a lower side of the person P1. However, it may not be preferable that the message is positioned on a lower side of a subject of a certain user. The certain user is not able to print the image print as desired in the aforementioned process. In the first embodiment, the following printing process is performed. It is assumed that a printing direction in an initial state is set to a direction indicated by FIGS. 10A to 11 by operating the rear operation unit 24.

Printing Process According to First Embodiment

Figure 12:
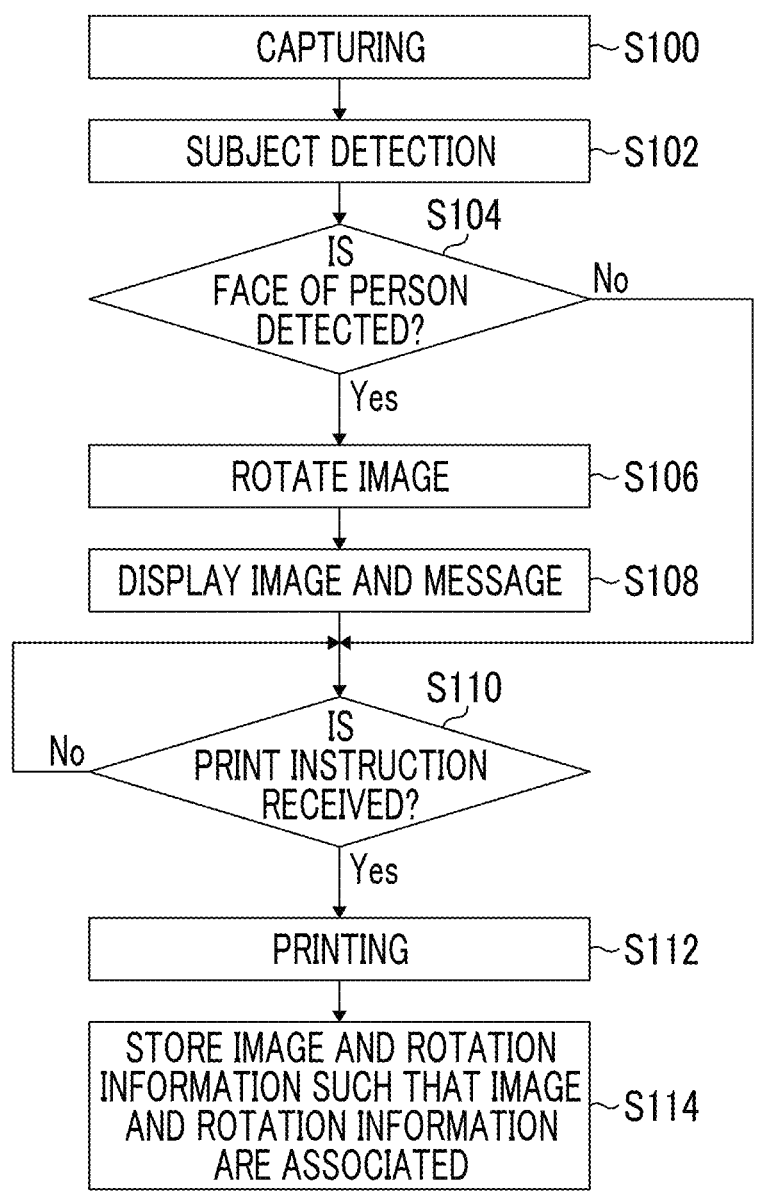
FIG. 12 is a flowchart showing a procedure of a printing process according to the first embodiment.

Hereinafter, a printing process according to the first embodiment will be described. FIG. 12 is a flowchart showing a procedure of the printing process. It is assumed that the subject is the person P1 of FIG. 9.

In a case where the digital camera with a printer 1 is activated, the system controller 240 performs live view display on the monitor 22, and images an image according to a capturing instruction of the user in the state of the live view display. The live view display means that the image caught by the image sensor 42 is displayed on the monitor 22 in real time, and is also called "through display". The capturing instruction to perform the actual capturing is received by operating the fully push of the first release button 16A or the second release button 16B. As the previous stage, the capturing preparation is performed by operating the half push of the first release button 16A or the second release button 16B. That is, the brightness and distance of the subject are measured, and thus, the setting of the exposure value and the focusing are performed.

The instruction to perform the actual capturing is received by operating the fully push of the first release button 16A or the second release button 16B after the half push of any one of these buttons is operated, and the process of the actual capturing is performed (step S100; image input process). That is, the image sensor 42 is exposed with the set exposure value, and the image for recording is received. The received image is recorded as the captured image in the internal memory 222.

In the auto mode, the system controller 240 performs the following process, and the rotated image is printed. In the manual mode, the captured image is rotated and the image together with the marginal area 115 is previewed on the monitor 22 by performing the following process (step S108 of FIG. 12), and in a case where the print button and the OK button are pressed in this state, the print instruction is confirmed, and the system controller 240 performs the following process.

In step S102 (subject detection process), the subject of the captured image is detected subsequently to the actual capturing process, and it is determined whether or not the face of the person is detected in step S104 based on the detection result (subject detection process). These processes are performed by the image signal processing unit 236 under the control of the system controller 240. The face detection may be performed by various known methods. For example, an image of a target area and a face image template are collated while moving a position of the target area on the captured image, and the correlation therebetween is investigated. In a case where a correlation score exceeds a preset threshold, the target area is set as a face area. In a case where the face is not detected, the process is repeated while changing the size of the target area. As the face detection method, a method of detecting a feature area (for example, which has a range of a flesh color, has black areas (eyes) in the range of the flesh color, and is an area in which the range of the flesh color has the shape of the face) included in the face, as the face area may be used. In a case where the face of the person is not detected in steps S102 and S104, the processes of step S106 and S108 are canceled, and the process proceeds to step S110.

Figure 13:
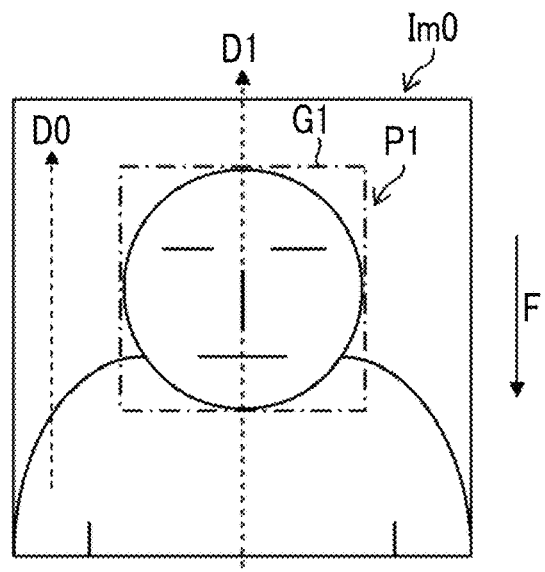
FIG. 13 is a diagram for describing the rotation of an image according to the first embodiment.

In this case, it is assumed that the face of the person P1 is detected from a captured image Im0 as shown in FIG. 13 (Yes in step S104). In FIG. 13, a dash-dotted line represents a frame G1 for face detection (which is not printed). It is not necessary to use the frame in the face detection. The frame is appropriately omitted in the subsequent diagrams.

Figure 14:
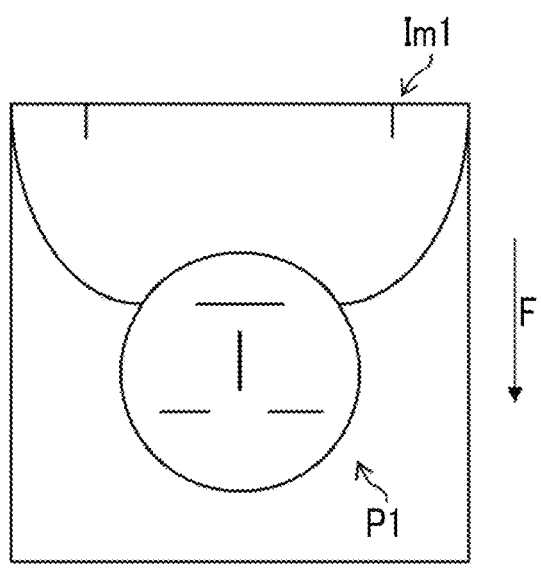
FIG. 14 is another diagram for describing the rotation of the image according to the first embodiment.

In step S106, the captured image Im0 is rotated based on the result of the face detection (image rotation process). In the example of FIG. 13, since an upward and downward direction D1 of the face matches an upward and downward direction D0 of the captured image Im0, the captured image Im0 is rotated by 180 degrees such that the upward and downward direction D1 matches the transport direction (the direction of the arrow F). The image (image Im1) acquired through the rotation is shown in FIG. 14. It is not necessary to display the arrow indicating the upward and downward direction of the face and the frame for face detection described above on the monitor 22.

In a case where the image is rotated and displayed as shown in FIGS. 13 and 14, the upward and downward direction of the face (subject) may be determined from the result of the face detection (image processing), or may be determined from the orientation of the digital camera with a printer 1 in a case where the image is captured. For example, the "orientation of the digital camera with a printer 1 in a case where the image is captured" may be determined by setting a gravity direction detected by an acceleration sensor.

Figure 15:
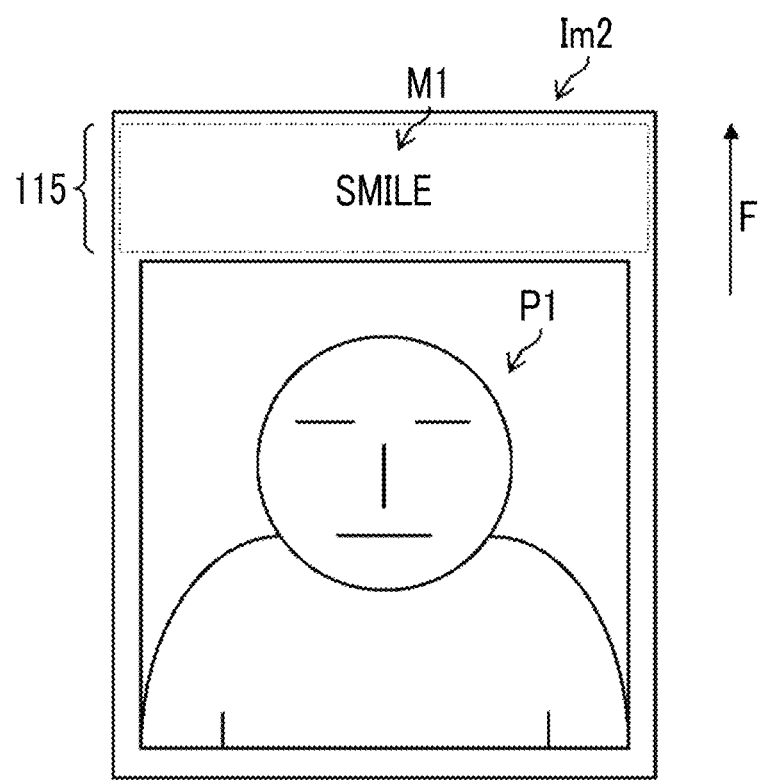
FIG. 15 is a diagram showing a print image according to the first embodiment.
Figure 16:
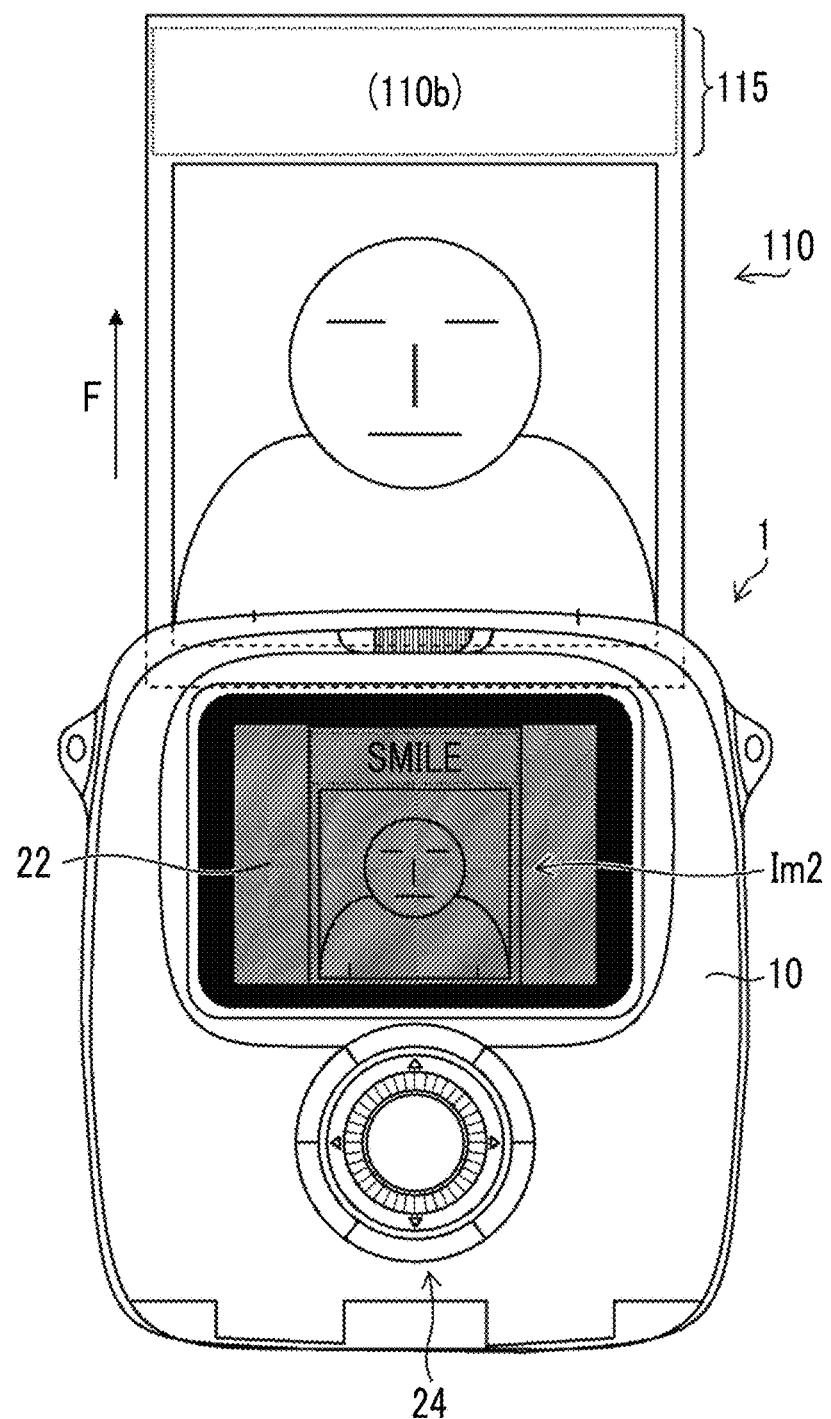
FIG. 16 is a diagram showing a case where the print image according to the first embodiment is displayed and printed.

In a case where the image Im1 is acquired by rotating the captured image Im0 in step S106, a print image Im2 (an image acquired by arranging the image Im1 and the marginal area 115 according to the rotation of the image; an example of an image for display) is displayed on the monitor 22 (step S108; see FIG. 16). In a case where the rotated image Im1 is printed, since the instant film is transported such that the marginal area 115 is positioned in an upward direction (an example of a "specific direction") of the person P1 (in the direction of the arrow F of FIGS. 15 and 16), the marginal area 115 is arranged in the upward direction of the person P1 with respect to the image Im1 on the print image Im2 (see FIG. 15).

As shown in FIGS. 15 and 16, in a case where the print image Im2 is displayed, a sample (a sample M1 in FIG. 15) of the message is displayed in the marginal area 115 arranged so as to be positioned in an upper part of the image Im1. In the first embodiment, it is possible to check the state in which the user fills out the message in the marginal area 115 through such display, and it is possible to easily acquire an intended print. The content of the sample of the message is not particularly limited, and the display may be performed by using letters, numbers, symbols, or geometric shapes. It is assumed that the user fills out the sample M1 of FIG. 15 by handwriting, and handwritten letters are displayed. The kind of letters is not limited to such an aspect.

In step S110, it is determined whether or not the print instruction is received. This determination may be performed depending on whether or not the menu button 24a is pushed. Specifically, the print instruction is confirmed in a case where the menu button 24a which is the OK button is pushed, and the print instruction is canceled in a case where the function button 24c5 which is the back button is pushed. A dialog for a print instruction is displayed on the monitor 22, and thus, the print instruction and the cancellation thereof may be performed. The determination depending on whether or not the print instruction is received may be performed only in the manual mode, and step S110 may be skipped in the auto mode.

In a case where the menu button 24a is pushed in a state in which the print image Im2 is displayed on the monitor 22, the print instruction is confirmed, and the printing is performed as shown in FIG. 16 (step S112; image printing process). As mentioned above, in the first embodiment, since the image Im1 is acquired by rotating the captured image Im0 by 180 degrees, the orientation of the subject on the print image Im2 displayed on the monitor 22 matches the orientation of the subject on the instant film 110 to be ejected, and the user does not feel incompatibility. Similarly to the case described in the general printing, the brightness and/or saturation of the print image Im2 to be displayed on the monitor 22 may be lowered, and the print image may be displayed.

The process proceeds to step S114 in a case where the printing is ended, rotation information (in this case, information related to the rotation of the captured image Im0 by 180 degrees) of the captured image Im0 is stored in association with the image is stored in the internal memory 222. The rotation information may be recorded in a header of an image file. Alternatively, the rotation information may be recorded as a separate file and may be linked with the image file. It is possible to rotate the image according to the instruction of the user through the storing.

As described above, according to the digital camera with a printer 1, since the captured image Im0 is rotated based on the result of the face detection and the print image Im2 including the rotated image Im1 and the marginal area 115 is displayed on the monitor 22, it is possible to check the positional relationship between the image Im1 and the marginal area 115 before the image is printed. Since the sample (see the sample M1 of FIG. 15) of the message is displayed on the monitor according to an arrangement direction (on the upper side of the face) of the marginal area 115, it is possible to check the state in which the user fills out the message in the marginal area 115 before the image is printed.

As stated above, according to the first embodiment, in a case where the image is printed by using the instant film having the image forming area and the marginal area, it is possible to acquire the print on which the marginal area is positioned in a desired direction with respect to the subject.

Although it has been described in the first embodiment that the captured image is rotated such that the marginal area is positioned on an upper side of the face, the user may prefer that the marginal area is positioned on a lower side of the face. In such a case, it is determined that the determination result is No in response to the operation of the rear operation unit 24 (function buttons 24c1 to 24c6) in step S110, and the process proceeds to step S106. In this step, the image Im1 may be rotated again, and the rotated image may be usually printed. In this case, the print on which the marginal area 115 is positioned on the lower side of the person P1 is acquired as shown in FIGS. 10A and 10B.

In the digital camera with a printer 1, since a printing direction (in any one of FIGS. 15 and 16) in an initial state (a state in which the instruction is received from the user) is able to be set by the operation of the rear operation unit 24 as stated above, there are some cases where "the printing direction is set in the initial state as shown in FIG. 16 but the user prefers that the image is printed as shown in FIG. 15". In such a case, similarly to the first embodiment, the print image may be acquired by rotating the captured image, may be displayed on the monitor 22, and may be printed.

Another Example 2 of Image Rotation

In the first embodiment, it has been described that the orientation of the face of the subject matches the upward and downward direction of the image (see FIG. 13). However, there are some cases where the orientation of the face is inclined without matching the upward and downward direction of the image in some orientations of the subject and in some directions in which the user holds the digital camera with a printer 1. Hereinafter, the rotation of the image in such a case will be described.

Figure 17:
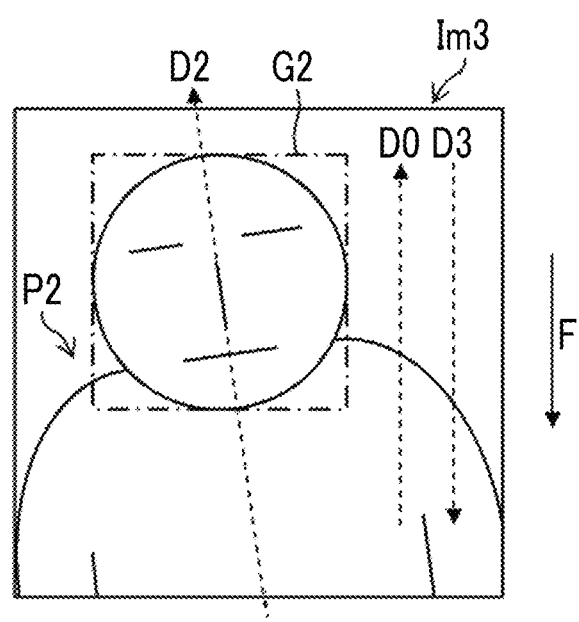
FIG. 17 is a diagram for describing another Example 1 of the image rotation.

FIG. 17 is a diagram showing a captured image Im3 in a case where the orientation of the face is inclined (the arrow F indicates the transport direction in a case where the image is printed in FIG. 17). In FIG. 17, an upward and downward direction D2 of a face (detected by a frame G2) of a person P2 which is the subject is inclined without matching the upward and downward direction D0 of the captured image Im3. In this case, similarly to the first embodiment, the captured image is able to be rotated by about 180 degrees such that the upward and downward direction D2 of the face matches a direction D3 which is a direction opposite to the upward and downward direction D0 of the captured image Im3, and thus, the rotated image is the same as the image Im1 shown in FIG. 14. Accordingly, the relationship between the person P2 which is the subject and the marginal area 115 is the same as that in the print image Im2 shown in FIG. 15, and the displaying and printing of the image are performed and printed similarly to those described in FIG. 16.

In the state of FIG. 17, similarly to the aforementioned "general state", the image may be rotated such that the upward and downward direction D2 of the face matches the upward and downward direction D0 of the captured image Im3. In this case, the marginal area 115 is positioned on the lower side of the face (an example of the "specific direction") with respect to a rotated image Im3a as shown in FIG. 18A. Accordingly, a print image Im4 (image for display) including the rotated image Im3a and the marginal area 115 may be displayed on the monitor 22. In this case, the image together with the sample M1 of the message is displayed in the marginal area 115.

In a case where the print image IM4 is displayed on the monitor 22, the face is orientated downward, and the user is likely to feel hard to see. In a case where the image is displayed on the monitor 22, the print image acquired by rotating the image such that the face is oriented upwards may be displayed on the monitor 22. In this case, in a case where the image is simply rotated by 180 degrees while retaining the positional relationship between the subject (person P2) and the sample M1 on the print image Im4, the image is displayed like a print image Im4a, and it is hard to visually perceive a sample M1a (see FIG. 18B). In such a case, the sample may also be rotated according to the rotation in a case where the print image is rotated, and the image may be displayed like a print image Im4b (see FIG. 18C). Accordingly, it is possible to visually perceive the print image Im4b (including the image Im3b and a sample M1b arranged under the image Im3b) with ease. Since the print image is rotated only for the display on the monitor 22, in a case where the image is displayed like the print image Im4b, the orientation of the print image on the monitor 22 and the orientation of the image on the instant film 110 to be transported are opposite to each other in a case where the image is printed (see FIG. 11).

According to the above-described Example 1, in a case where the subject is photographed so as to be inclined, the image is rotated, and thus, the image and the print on which the marginal area is positioned on the upper side or the lower side of the face are acquired. Thus, the user can acquire the image on which the subject is easy to be seen. In a case where the image is rotated as in Example 1, since a rotation angle is not 180 degrees, the shapes of the rotated image and the image forming area (observation part 118) do not match each other. The image may be appropriately expanded, contracted, and trimmed off such that the shapes match each other (the same is true of the first embodiment and the following examples).

Another Example 2 of Image Rotation

Although it has been described in the first embodiment and Example 1 that the subject is one person, the subject may include a plurality of persons, and directions of the faces may be different. The rotation of the image in such a case will be described below.

Figure 19:
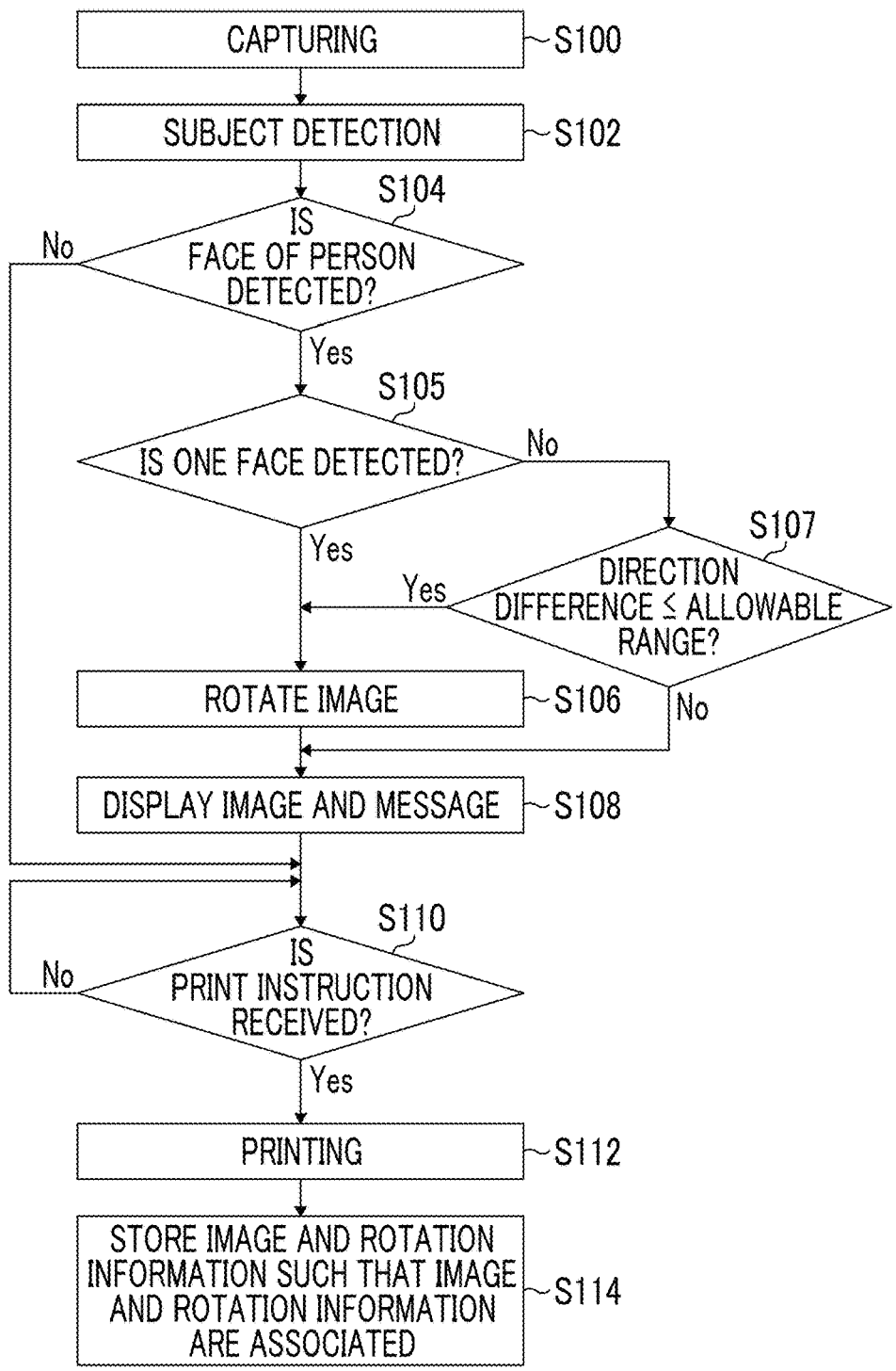
FIG. 19 is a flowchart for describing another Example 2 of the image rotation.

FIG. 19 is a flowchart showing a process of rotating the image in a case where the subject includes the plurality of persons. The same step numbers will be assigned to the steps that perform the same processes as those of FIG. 12, and the detailed description thereof will be omitted.

Figure 20:
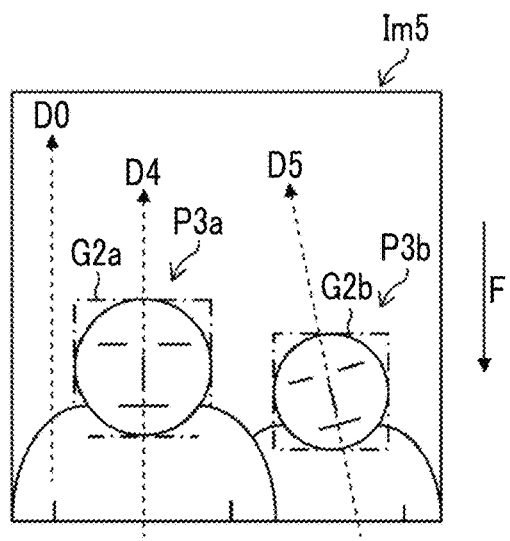
FIG. 20 is a diagram for describing another Example 2 of the image rotation.

In the flowchart of FIG. 19, in a case where it is determined that the "face of the person is detected" in step S104 (subject detection process) (the determination result is Yes), it is determined whether or not one face is detected in step S105 (subject detection process). In a case where the plurality of faces is detected (No in step S105), the process proceeds to step S107 (the subject detection process and the image rotation process), and it is determined whether or not the difference between the directions of the plurality of faces is within the allowable range. For example, as shown in FIG. 20, the subjects detected from the captured image Im5 are a person P3a and a person P3b (represented by frames G2a and G2b). In a case where the directions of the faces of the persons are an upward and downward direction D4 and an upward and downward direction D5, it is determined whether or not an angle formed by the upward and downward direction D4 and the upward and downward direction d5 is equal to or less than the allowable range. For example, an arbitrary value such as 30 degrees, 45 degrees, or 90 degrees may be set as a value of the allowable range if necessary. It is assumed that the direction of the captured image Im5 is the upward and downward direction D0, and the upward and downward direction D4 matches the upward and downward direction D0.

Figure 21:
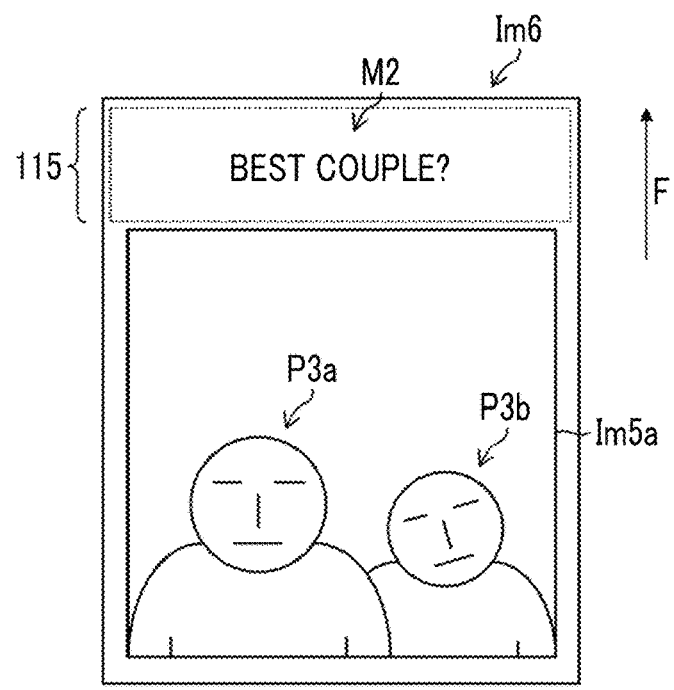
FIG. 21 is a diagram for describing another Example 2 of the image rotation.

It is assumed in the example of FIG. 20 that the angle formed by the upward and downward direction D4 and the upward and downward direction D5 is small and is equal to or less than the allowable range. In this case, the image is rotated similarly to the first embodiment (see FIGS. 13 to 15), and the image is displayed on the monitor 22 in the state of the print image Im6 (image for display) of FIG. 21. The sample M2 of the message is displayed in the marginal area 115 in a display direction (the upward and downward direction in a case where the image is displayed on the monitor 22 matches the upward and downward direction of the image) corresponding to the positional relationship between the rotated image Im5a and the marginal area 115. The case where the image is displayed and printed on the monitor 22 is the same as that of FIG. 16.

Figure 22:
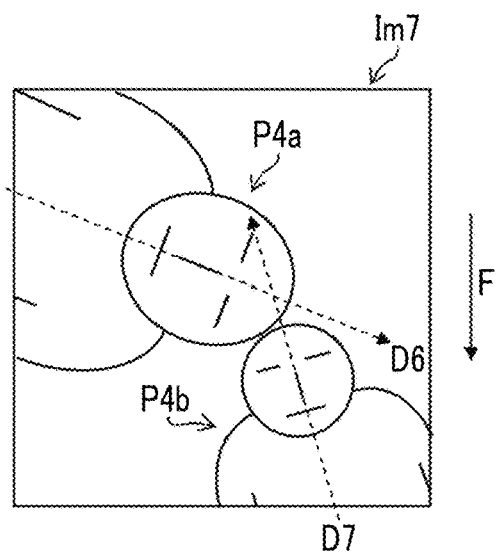
FIG. 22 is a diagram for describing another Example 2 of the image rotation.

FIG. 20 shows an example in which the difference between the directions of the faces is small and is equal to or less than the allowable range. However, the difference between the directions of the faces may be greater than the allowable range. FIG. 22 shows a captured image Im7 in a case where a difference between directions (upward and downward directions D6 and D7) of faces of persons P4a and P4b is greater and an angle formed by the upward and downward directions D6 and D7 exceeds 120 degrees. In a state in which the directions of the faces are different in this manner, since it is hard to see another face in a case where the image is rotated according to any face, the image may not be rotated in a case where the image printed as will be described below in a case where the difference between the directions of the faces is greater than the allowable range. The photographic composition shown in FIG. 22 is acquired in a case where a plurality of persons who is lying on the ground or the floor is captured from above or a case where a plurality of persons is looking down a camera positioned on the ground from above.

Figure 23:
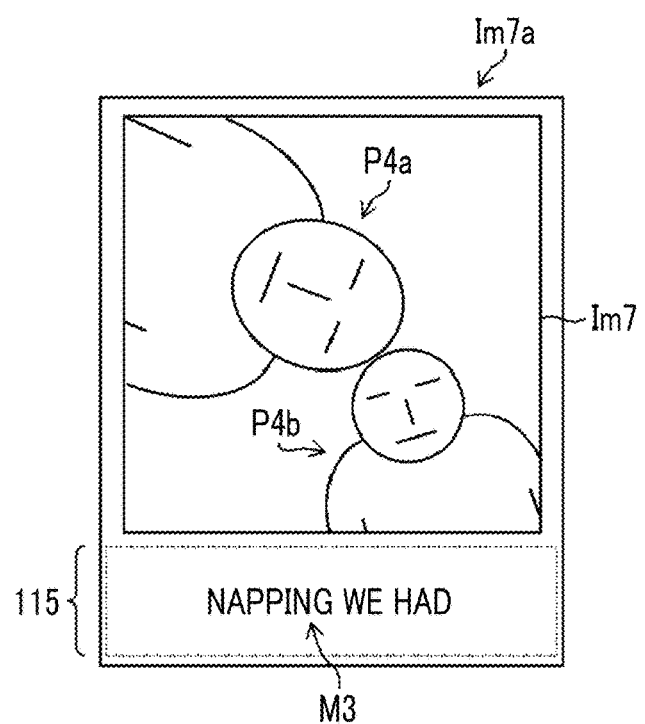
FIG. 23 is a diagram for describing another Example 2 of the image rotation.

In a case where the allowable range of the difference between the face directions is 90 degrees in the example of FIG. 22, since the difference between the directions of the faces exceeds the allowable range, the determination result of step S107 (the subject detection process and the image rotation process) is No. Step S106 (the image rotation process) is skipped, and the process proceeds to step S108 without rotating the captured image Im7. In this case, since the captured image Im7 is not rotated, a print image Im7a is displayed on the monitor 22 as shown in FIG. 23. The sample M3 of the message is displayed in the marginal area 115 in the display direction corresponding to the positional relationship between the captured image Im7 and the marginal area 115. The case where the image is displayed and printed on the monitor 22 is the same as that of FIG. 11.

Another Example 3 of Image Rotation

Figure 24:
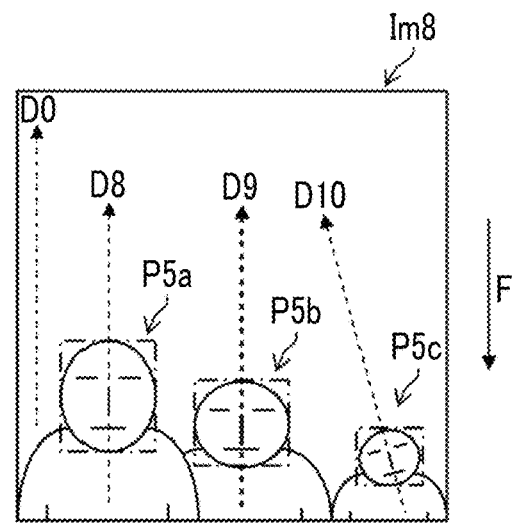
FIG. 24 is a diagram for describing another Example 3 of the image rotation.

Hereinafter, still another example of the image rotation will be described. FIG. 24 shows a case where a plurality of persons P5a, P5b, and P5c are detected from on a captured image Im8 by frames for face detection and upward and downward directions of faces of the persons are upward directions D8, D9, and D10. The upward and downward directions D8 and D9 match the upward and downward direction D0 of the captured image Im8, and the upward and downward direction D10 is different from the upward and downward direction D0.

Figure 25:
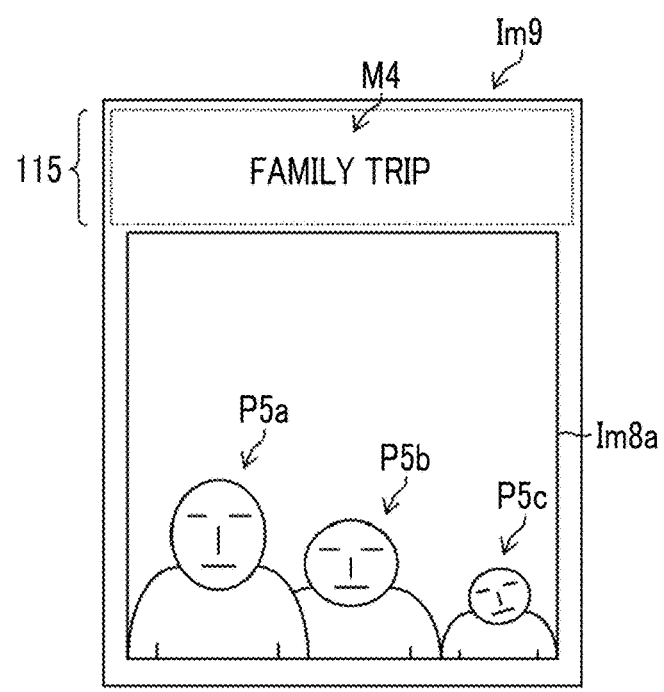
FIG. 25 is a diagram for describing another Example 3 of the image rotation.

In the present example, the captured image Im8 is rotated by preferentially taking account of a number of directions. Specifically, since two upward and downward directions D8 and D9 are the same direction and one upward and downward direction D10 is a different direction, the captured image Im8 is rotated so as to match the upward and downward directions D8 and D9. Similarly to the first embodiment (see FIGS. 13 to 15), a degree of rotation may be 180 degrees such that the upward and downward directions D8 and D9 of the faces of the persons P5a and P5b match the transport direction (direction of the arrow F). Accordingly, a print image Im9 (including the rotated image Im8a and the marginal area 115; image for display) shown in FIG. 25 is displayed on the monitor 22, and the marginal area 115 is positioned in the upward direction of the face of the person. A sample M4 of the message is displayed in the marginal area 115. The print image may be displayed and printed similarly to the case described in FIG. 16.

By doing this, in the present example, it is possible to check the positional relationship between the marginal area 115 and the image and the state in which the user fills out the message in the marginal area 115, and it is possible to acquire the print on which the marginal area 115 is positioned in the desired direction with respect to the persons P5a, P5b, and P5c which are the subjects.

Another Example 4 of Image Rotation

Figure 26:
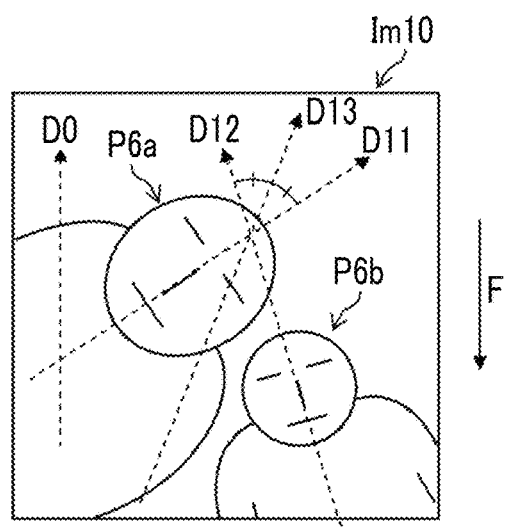
FIG. 26 is a diagram for describing another Example 4 of the image rotation.

Hereinafter, still another example of the image rotation will be described. In the present example, in a case where the difference between the face directions of the plurality of persons is equal to or less than the allowable range (for example, 90 degrees), the captured image is rotated with an intermediate direction between the plurality of face directions as its reference. For example, it is assumed that a plurality of persons P6a and P6b is photographed on a captured image Im10 as shown in FIG. 26 and face directions are respectively upward and downward directions D11 and D12. The difference (an angle formed by the upward and downward directions D11 and D12) between the face directions is equal to or less than 90 degrees. In this case, the captured image Im10 is rotated such that a direction D13, which is an intermediate direction between the upward and downward directions D11 and D12, matches the transport direction (the direction of the arrow F) as its reference.

Figure 27:
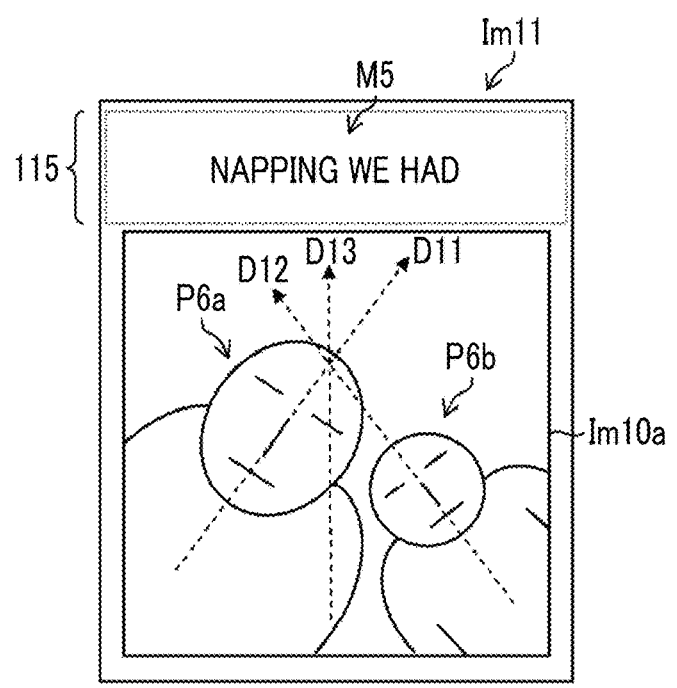
FIG. 27 is a diagram for describing another Example 4 of the image rotation.

A print image IM11 (image for display) acquired through such rotation is shown in FIG. 27. On the print image Im11, the marginal area 115 is arranged so as to be positioned on an upper side of the rotated image Im10a, and a sample M5 of the message is displayed. The print image may be displayed and printed similarly to the case described in FIG. 16. As stated above, in the present example, it is possible to check the positional relationship between the marginal area 115 and the image and the state in which the user fills out the message in the marginal area 115, and it is possible to acquire the print on which the marginal area 115 is positioned in the desired direction with respect to the persons P6a and P6b which are the subjects.

Trimming of Image

Figure 28:
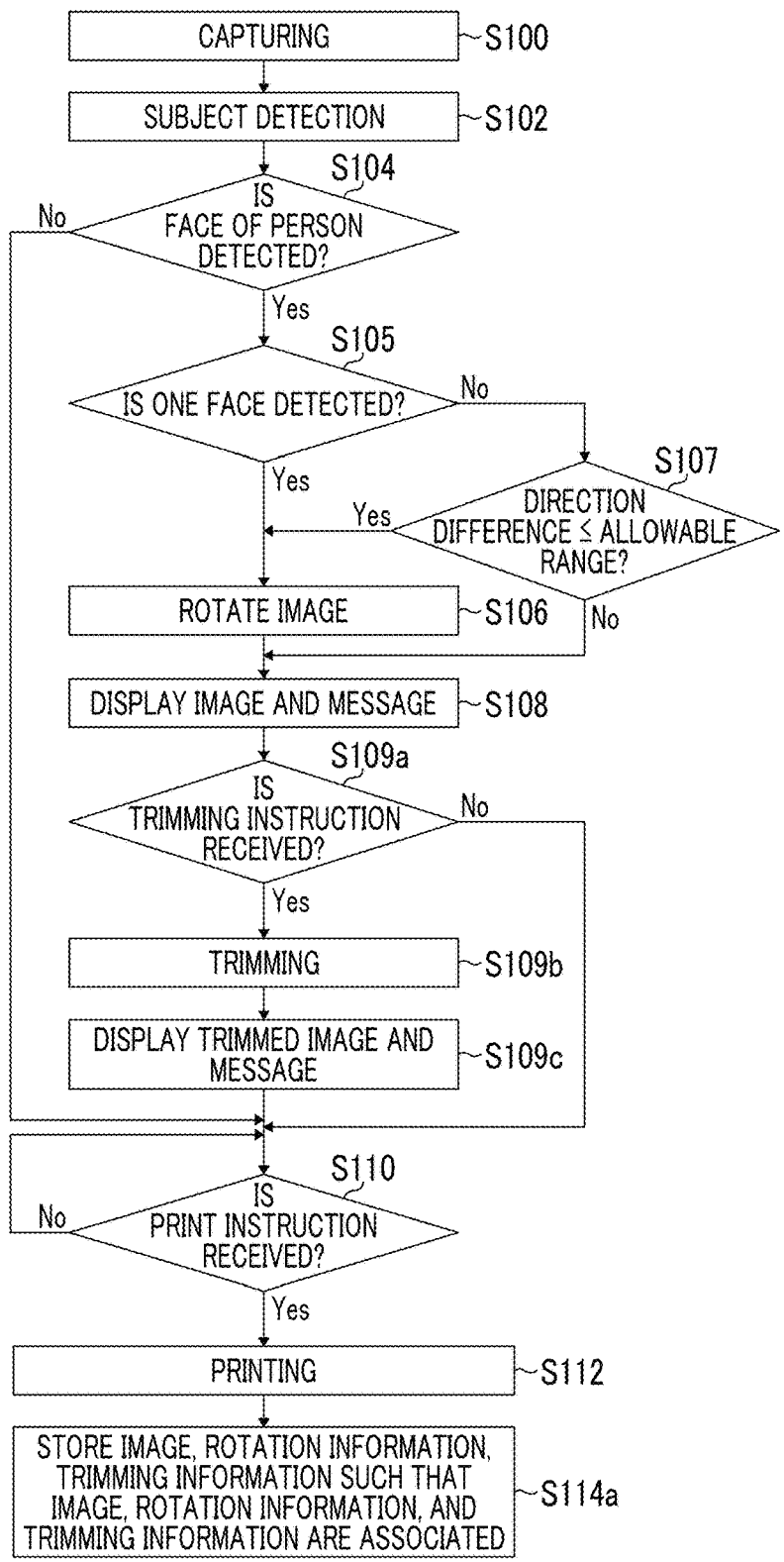
FIG. 28 is a diagram for describing the trimming of the image.

Hereinafter, the trimming of the image rotated as described above will be described. The person is photographed so as to be small in some capturing conditions, and it is possible to acquire the print on which the person or the face thereof occupies most of the image through the trimming. FIG. 28 is a flowchart showing a process of rotating and trimming off the image. In FIG. 28, the same processes as those of FIGS. 12 and 19 will be assigned the same step numbers, and the detailed description thereof will be omitted.

In the flowchart of FIG. 28, after the rotated image and the sample of the message are displayed in step S108, it is determined whether or not a trimming instruction is received in step S109a. This determination may be performed depending on whether or not the user inputs the instruction through the rear operation unit 24. In a case where the determination result is Yes, the process proceeds to step S109b, and the trimming is performed. The trimmed image and sample of the message are displayed in step S109b. The trimming process is performed by the image signal processing unit 236 for printing under the control of the system controller 240.

Figure 29:
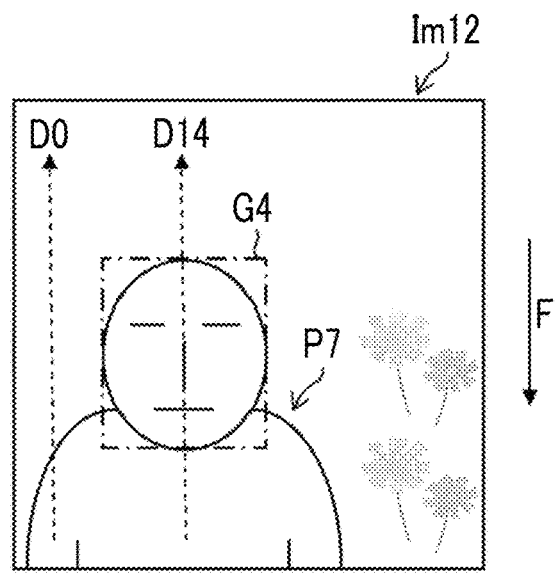
FIG. 29 is another diagram for describing the trimming of the image.
Figure 30:
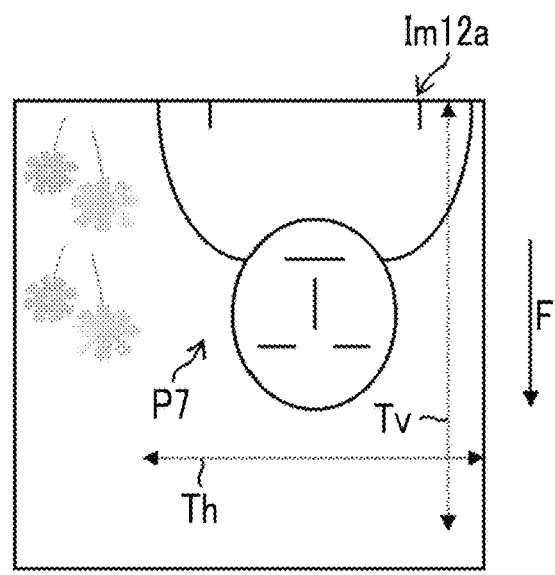
FIG. 30 is still another diagram for describing the trimming of the image.

For example, it is assumed that a person P7 is detected by a frame G4 for face detection on a captured image Im12 and the direction of the face is the upward and downward direction D14 as shown in FIG. 29. In this case, in a case where the image is rotated by 180 degrees such that the upward and downward direction D14 matches the transport direction (the direction of the arrow F), an image Im12a shown in FIG. 30 is acquired. However, since the person P7 exists near an end of the image on the image Im12a, a portion other than the person is partially trimmed. For example, another area may be trimmed while remaining a vertical range Tv and a horizontal range Th shown in FIG. 30. The vertical range Tv and the horizontal range Th are set within the image Im12a with the face of the person P7 as its center, and a blank (non-image portion) is not formed in the trimmed image.

Figure 31:
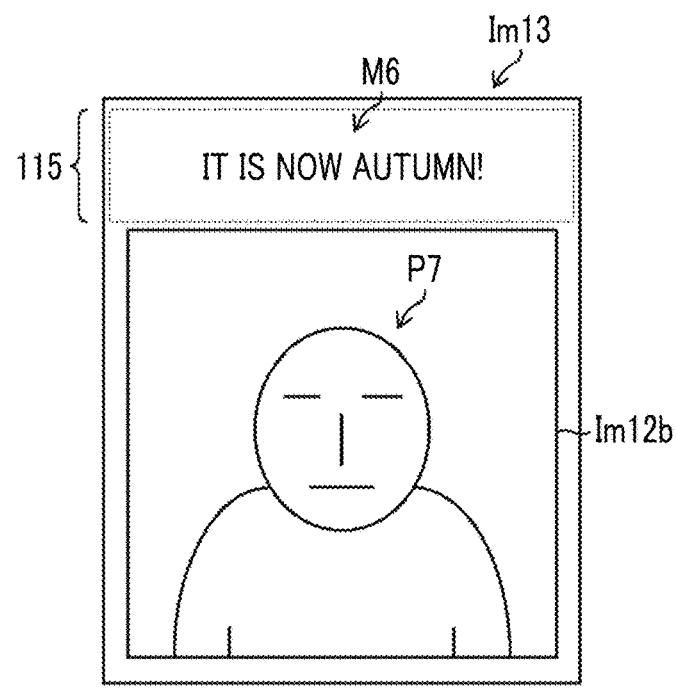
FIG. 31 is still another diagram for describing the trimming of the image.

After the trimming is performed in this manner, the trimmed image and the sample of the message are displayed on the monitor 22 in step S109c. For example, a print image Im13 (image for display) shown in FIG. 31 is displayed. An image Im12b acquired by rotating the image as described above and partially trimming a portion other than the person P7 and the marginal area 115 positioned in the upward direction of the face of the person P7 are displayed on the print image Im13. A sample M6 of the message is displayed in the marginal area 115. The print image may be displayed and printed similarly to the case described in FIG. 16. Similarly to the first embodiment, information indicating the content of the rotation and/or trimming of the image is stored in association with the captured image in the internal memory 222 (step S114a), and the content of the rotation and/or trimming may be realized according to the instruction of the user.

Second Embodiment

Although it has been described in the first embodiment and another examples that the printer, the capturing device, and the printing method of the present invention are implemented by the digital camera with a printer 1, the printer, the capturing device, and the printing method of the present invention may be implemented by a smartphone and a printer other than such aspects.

Figure 32:
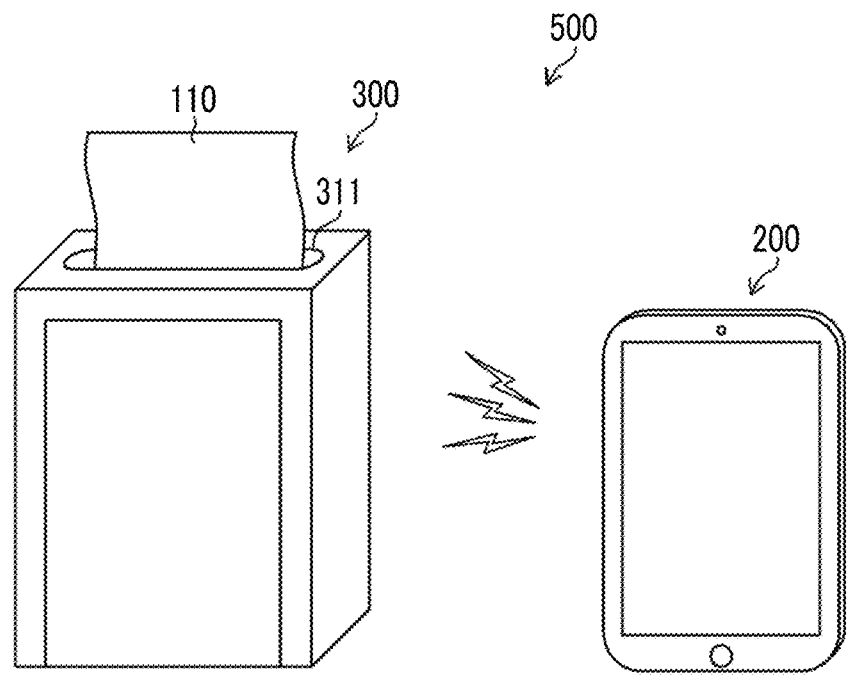
FIG. 32 is a diagram showing a configuration of a print system according to a second embodiment.

FIG. 32 is a diagram showing a configuration of a print system 500 according to a second embodiment of the present invention. The print system 500 includes a smartphone 200 (a camera with a printer or a printer) and a printer 300 (printer). The smartphone 200 includes an image pickup unit (digital camera) that acquires an image by using an image pickup optical system and an imaging element, an image processing unit that rotates an image, and a monitor having a touch panel function (not shown in FIG. 32). The user performs the same operation as that of the rear operation unit 24 described in the first embodiment while displaying the captured image and/or the print image on the monitor. A program for performing the printing method according to the present invention is installed as application software on the smartphone 200, and the same process as that of the digital camera with a printer 1 described in the first embodiment is performed by controlling the application software. That is, the smartphone 200 according to the second embodiment functions as the image input unit, the subject detection unit, the image rotation unit, the display control unit, and the trimming unit of the printer and the camera with a printer according to the present invention, and also functions as the display device that displays the captured image or the print image. The smartphone 200 has a part (a function of transmitting the print instruction to the printer 300) of the function (print unit) of the printer according to the present invention.

The printer 300 communicates with the smartphone 200 in a wired and/or wireless manner, and prints the image according to the instruction from the smartphone 200. Similarly to the first embodiment, the instant film 110 accommodated in the instant film pack 100 may be used in the printer 300, and the printed instant film 110 is ejected from an ejection port 311.

Similarly to the first embodiment and another examples, in the print system 500 having the above-described configuration, the image pickup (image reception), the rotation of the image, the display of the print image (including the image, the marginal area, and the sample of the message), and the print instruction may be performed by the process procedure represented in the flowcharts of FIGS. 12, 19, and 28. Accordingly, it is possible to acquire the print on which the marginal area is positioned in the desired direction with respect to the subject, and it is possible to check the state in which the user fills out the message in the marginal area. The function of the smartphone 200 of the print system 500 may be implemented by installing the same software as the application software on the personal computer.

Other Examples

Although it has been described in the aforementioned embodiments and examples that the subject is the face of the person, the subject of the present invention is not limited to the face of the person. Another subject having an upward and downward direction such as sky, sea, ground, tree, building, or various devices may be used.

Although the embodiments and examples of the present invention have been described, the present invention is not limited to the aforementioned aspects, and may be variously modified without departing from the spirit of the present invention.

EXPLANATION OF REFERENCES

1: digital camera with printer
10: camera body
10A: main body
10B: back cover
10C: hinge
12: imaging lens
12a: stop
12b: shutter
14: power ring
16A: first release button
16B: second release button
18: flash
20: auxiliary light lamp
22: monitor
24: rear operation unit
24a: menu button
24b: command dial
24c1: function button
24c2: function button
24c3: function button
24c4: function button
24c5: function button
24c6: function button
26: capturing mode switching lever
28: print ejection port
30: unlocking lever
42: image sensor
50: film loading room
52: film delivery mechanism
52a: claw
54: film transport mechanism
54A: transport roller pair
54B: spreading roller pair
56: print head
100: instant film pack
110: instant film
110a: exposure surface
110b: observation surface
112: exposure part
114: pod part
114a: development treatment liquid pod
115: white area
116: trap part
116a: absorbing material
118: observation part
118a: frame
120: case
120a: opening
120b: ejection port
120c: claw opening
200: smartphone
212: imaging lens driving unit
214: image sensor driving unit
216: analog signal processing unit
218: image data input unit
220: digital signal processing unit
222: internal memory
230: film delivery mechanism driving unit
232: film transport mechanism driving unit
234: print head driving unit
236: image signal processing unit for printing
240: system controller
242: work memory
244: data memory
246: monitor driving unit
248: operation unit
250: power supply unit
300: printer
500: print system
D0: upward and downward direction
D1: upward and downward direction
D10: upward and downward direction
D11: upward and downward direction
D12: upward and downward direction
D13: direction
D14: upward and downward direction
D2: upward and downward direction
D3: direction
D4: upward and downward direction
D5: upward and downward direction
D6: upward and downward direction
D7: upward and downward direction
D8: upward and downward direction
D9: upward and downward direction
F: arrow
G1: frame
G2a: frame
G2b: frame
G4: frame
Im0: captured image
Im1: image
Im2: print image
Im3: captured image
Im3a: image
Im3b: image
Im4: print image
Im4a: print image
Im4b: print image
Im5: captured image
Im5a: image
Im6: print image
Im7: captured image
Im7a: print image
Im8: captured image
Im9: print image
Im10: captured image
Im10a: image
Im11: print image
Im12: captured image
Im12a: image
Im12b: image
Im13: print image
M1: sample
M1a: sample
M1b: sample
M2: sample
M3: sample
M4: sample
M5: sample
M6: sample
P1: person
P2: person
P3a: person
P3b: person
P4a: person
P5a: person
P6a: person
P7: person
S100 to S114a: steps of printing process method Th: horizontal range
Tv: vertical range
x: arrow
y: arrow
z: arrow

What is claimed is:

1. A printer that prints an image on an instant film having an image forming area and a marginal area which is formed in one side and is wider than other marginal areas in other sides and is an area different from the image forming area, the printer comprising:
a controller that
receives an image,
detects a face as a subject from the received image, and
rotates the received image according to an orientation of the face as the subject such that the marginal area is positioned in a specific direction with respect to the face as the subject in a case where the rotated image is printed on the instant film; and
a print unit that prints the rotated image on the instant film.

2. The printer according to claim 1, further comprising:
a display control unit that arranges the rotated image and the marginal area such that the marginal area is positioned in the specific direction with respect to the rotated image, and displays the rotated image and the marginal area on a display device.

3. The printer according to claim 2,
wherein the display control unit displays a sample of a message on the display device in a direction corresponding to the arrangement in the displayed marginal area.

4. The printer according to claim 2,
wherein the display control unit displays an image for display, which is acquired by rotating the received image or the rotated image according to a transport direction of the instant film in a case where the image is printed, on the display device.

5. The printer according to claim 3,
wherein the display control unit displays an image for display, which is acquired by rotating the received image or the rotated image according to a transport direction of the instant film in a case where the image is printed, on the display device.

6. The printer according to claim 1,
wherein the specific direction is an upward direction or a downward direction with respect to the detected face as the subject.

7. The printer according to claim 2,
wherein the specific direction is an upward direction or a downward direction with respect to the detected face as the subject.

8. The printer according to claim 3,
wherein the specific direction is an upward direction or a downward direction with respect to the detected face as the subject.

9. The printer according to claim 4,
wherein the specific direction is an upward direction or a downward direction with respect to the detected face as the subject.

10. The printer according to claim 5,
wherein the specific direction is an upward direction or a downward direction with respect to the detected face as the subject.

11. The printer according to claim 1,
wherein the detected face as the subject is a face of a person as the subject.

12. The printer according to claim 11,
wherein the controller rotates the received image such that the marginal area is positioned on an upper side of the face of the person.

13. The printer according to claim 11,
wherein the controller rotates the received image such that the marginal area is positioned on a lower side of the face of the person.

14. The printer according to claim 11,
wherein, in a case where the controller detects faces of a plurality of persons and a difference between directions of the faces of the plurality of persons is within an allowable range, the controller rotates the received image.

15. The printer according to claim 11,
wherein, in a case where the controller detects faces of a plurality of persons and a difference between directions of the faces of the plurality of persons exceeds an allowable range, the controller does not rotate the received image.

16. The printer according to claim 11, further comprising:
a trimming unit that trims off a part of an area excepting the detected face of the person in the rotated image,
wherein the print unit prints the trimmed image.

17. The printer according to claim 16, further comprising:
a storage unit that stores information indicating content of the rotation and/or the trimming in association with the received image.

18. The printer according to claim 1,
wherein the instant film is a self-development type instant film that includes a developer pod formed in the marginal area, and
the print unit transports the self-development type instant film such that the developer pod is in the front in a case where the image is printed.

19. A camera with a printer comprising:
the printer according to claim 1;
an image pickup optical system; and
an imaging element that outputs a signal representing an optical image of the subject formed by the image pickup optical system,
wherein the controller receives an image generated based on the output signal.

20. A printing method of printing an image on an instant film having an image forming area and a marginal area which is formed in one side and wider than other marginal areas in other sides and is an area different from the image forming area, the method comprising:
an image input process of inputting an image;
a subject detection process of detecting a face as a subject from the received image;
an image rotation process of rotating the received image according to an orientation of the detected face as the subject such that the marginal area is positioned in a specific direction with respect to the face as the subject in a case where the rotated image is printed on the instant film; and
an image printing process of printing the rotated image on the instant film.

* * * * *